United States Patent
Xu et al.

(10) Patent No.: US 11,438,187 B2
(45) Date of Patent: Sep. 6, 2022

(54) NETWORK DATA PROCESSING METHOD AND APPARATUS

(71) Applicant: HUAWEI TECHNOLOGIES CO., LTD., Guangdong (CN)

(72) Inventors: Min Xu, Shenzhen (CN); Lingli Pang, Shanghai (CN); Xiaoxiao Zheng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 38 days.

(21) Appl. No.: 16/573,373

(22) Filed: Sep. 17, 2019

(65) Prior Publication Data
US 2020/0014550 A1    Jan. 9, 2020

Related U.S. Application Data

(63) Continuation of application No. PCT/CN2017/077151, filed on Mar. 17, 2017.

(51) Int. Cl.
*H04L 12/18* (2006.01)
*H04L 12/66* (2006.01)
*H04L 61/5069* (2022.01)

(52) U.S. Cl.
CPC ........ *H04L 12/185* (2013.01); *H04L 12/1881* (2013.01); *H04L 12/66* (2013.01); *H04L 61/5069* (2022.05)

(58) Field of Classification Search
CPC ... H04L 12/185; H04L 12/1881; H04L 12/66; H04L 12/189; H04L 61/2069
See application file for complete search history.

(56) References Cited

U.S. PATENT DOCUMENTS

| 7,778,212 B2 * | 8/2010 | Lee ..................... H04W 72/005 370/312 |
| 2006/0109795 A1 * | 5/2006 | Kamata ................. H04M 15/00 370/252 |

(Continued)

FOREIGN PATENT DOCUMENTS

| CN | 101369909 A | 2/2009 |
| CN | 101388784 A | 3/2009 |

(Continued)

OTHER PUBLICATIONS

Extended European Search Report issued in European Application No. 17900395.9 dated Dec. 16, 2019, 8 pages.

(Continued)

*Primary Examiner* — Saumit Shah
(74) *Attorney, Agent, or Firm* — Fish & Richardson P.C.

(57) ABSTRACT

The present disclosure relates to network data processing methods and apparatus. One example method includes receiving a multicast group join request sent by a terminal, adding a terminal identifier to a multicast group corresponding to a target channel identifier, where the multicast group corresponding to the target channel identifier includes an identifier of a terminal that has requested network data corresponding to the target channel identifier, and delivering the network data based on the multicast group and a group scheduling identifier corresponding to the multicast group by using an air interface resource corresponding to the multicast group, where a terminal in the multicast group decodes the air interface resource based on the group scheduling identifier to obtain the network data.

17 Claims, 9 Drawing Sheets

(56) References Cited

U.S. PATENT DOCUMENTS

| | | | | |
|---|---|---|---|---|
| 2008/0084878 A1* | 4/2008 | Akbar | ............... | H04L 12/189 370/390 |
| 2015/0003315 A1 | 1/2015 | Chen et al. | | |
| 2017/0149548 A1* | 5/2017 | Mouhouche | ......... | H04L 1/0027 |

FOREIGN PATENT DOCUMENTS

| CN | 100544462 C | 9/2009 |
|---|---|---|
| CN | 101588537 A | 11/2009 |
| CN | 102547592 A | 7/2012 |
| CN | 102595624 A | 7/2012 |
| CN | 102821166 A | 12/2012 |
| CN | 105577321 A | 5/2016 |
| CN | 106161044 A | 11/2016 |
| EP | 1953953 A2 | 8/2008 |
| EP | 1956767 A2 | 8/2008 |
| EP | 2326112 A2 | 5/2011 |
| EP | 2661013 A1 | 11/2013 |
| EP | 2802163 A1 | 11/2014 |
| EP | 2658338 B1 | 10/2015 |
| JP | 2005525720 A | 8/2005 |
| JP | 2006222659 A | 8/2006 |
| JP | 2010506544 A | 2/2010 |
| WO | 2008093208 A1 | 8/2008 |
| WO | 2016121787 A1 | 8/2016 |

OTHER PUBLICATIONS

PCT International Search Report and Written Opinion issued in International Application No. PCT/CN2017/077151 on Dec. 5, 2017, 17 pages (with English translation).

Office Action issued in Chinese Application No. 201780066924.3 dated Sep. 9, 2020, 33 pages (With English Translation).

Office Action issued in Japanese Application No. 2019-550623 dated Nov. 10, 2020, 19 pages (with English translation).

Office Action issued in Chinese Application No. 201780066924.3 dated Feb. 3, 2020, 30 pages (With English Translation).

* cited by examiner

NETWORK DATA PROCESSING METHOD AND APPARATUS

CROSS-REFERENCE TO RELATED APPLICATIONS

This application is a continuation of International Application No. PCT/CN2017/077151, filed on Mar. 17, 2017, the disclosure of which is hereby incorporated by reference in its entirety.

TECHNICAL FIELD

This disclosure relates to the field of network technologies, and in particular, to a network data processing method and apparatus.

BACKGROUND

A network data service is a service that integrates an Internet technology, a multimedia technology, a communications technology, and the like and that provides a plurality of types of network data services such as a digital television and a live video. For example, the network data service may be an interactive personality television (IPTV) service. The network data service may provide a plurality of channels, and provide different network data on different channels. A user may view the network data on the different channels by using a terminal.

The network data service relates to interaction between a plurality of devices such as a server, a gateway, a base station, and a terminal. For a plurality of terminals that need to obtain network data, the gateway establishes a communication resource between the gateway and the base station for each terminal, and delivers, to the base station by using different communication resources, network data required by different terminals. The base station also establishes an air interface resource between the base station and each terminal, and delivers network data to different terminals by using different air interface resources.

When the terminal needs to obtain network data on a specific channel, the terminal sends, to the server by using the base station and the gateway, a network data request that carries a target channel identifier. The server receives the network data request, delivers network data corresponding to the target channel identifier to the gateway. After receiving the network data, the gateway delivers the network data to the base station by using a communication resource corresponding to the terminal. The base station delivers the network data to the terminal by using an air interface resource between the base station and the terminal. In this case, the terminal receives the network data, and displays the network data for user viewing.

When a plurality of terminals request network data on a same channel, the gateway duplicates the network data to obtain a plurality of pieces of network data based on a quantity of terminals, and separately sends the network data to the base station by using communication resources corresponding to the terminals. After receiving the network data by using a communication resource corresponding to any terminal, the base station sends the network data to the terminal by using an air interface resource between the base station and the terminal, to respectively send the plurality of pieces of received network data to the plurality of terminals.

In a process of implementing this disclosure, a related technology has at least the following problems: When a plurality of terminals request network data on a same channel, the network data needs to be duplicated to obtain a plurality of pieces of network data, and the plurality of pieces of network data are separately delivered by using different communication resources and air interface resources. Consequently, a transmission resource waste is caused.

SUMMARY

To resolve a problem in a related technology, embodiments of this disclosure provide a network data processing method and apparatus. The technical solutions are as follows:

According to a first aspect, a network data processing method is provided, where the method is applied to a base station, and includes:

receiving a multicast group join request sent by a terminal, where the multicast group join request carries a target channel identifier, and the multicast group join request is used to request to add a terminal identifier of the terminal to a multicast group corresponding to the target channel identifier;

adding the terminal identifier to the multicast group corresponding to the target channel identifier, where the multicast group includes an identifier of a terminal that has requested network data corresponding to the target channel identifier; and delivering the network data based on the multicast group and a group scheduling identifier corresponding to the multicast group by using an air interface resource corresponding to the multicast group, where a terminal in the multicast group is configured to decode the air interface resource based on the group scheduling identifier, to obtain the network data.

In a first possible implementation of the first aspect, the adding the terminal identifier to the multicast group corresponding to the target channel identifier includes:

obtaining first channel record information, where the first channel record information includes at least one record entry, and each record entry includes at least one or more of a channel identifier, a group scheduling identifier, and a multicast group;

determining, based on the first channel record information, the multicast group corresponding to the target channel identifier; and adding the terminal identifier to the multicast group.

In a second possible implementation of the first aspect, before the delivering the network data based on the multicast group and a group scheduling identifier corresponding to the multicast group by using an air interface resource corresponding to the multicast group, the method further includes:

determining a communication resource identifier corresponding to the target channel identifier, where the communication resource identifier is used to determine a communication resource used by a gateway to deliver the network data to the base station; and receiving, based on the communication resource identifier, the network data delivered by the gateway.

In a third possible implementation of the first aspect, after the obtaining first channel record information, the method further includes:

when the first channel record information does not include a group scheduling identifier corresponding to the target channel identifier, assigning the group scheduling identifier to the target channel identifier, or obtaining, from preset configuration information, the group scheduling identifier corresponding to the target channel identifier, or receiving the group scheduling identifier that is corresponding to the target channel identifier and that is sent by a gateway;

adding a first target record entry to the first channel record information, where the first target record entry includes one or more of the target channel identifier, the group scheduling identifier, and the terminal identifier; and sending a network data request to the gateway, where the network data request carries the target channel identifier, and the network data request is used to request to obtain the network data corresponding to the target channel identifier and receive the network data sent by the gateway.

In a fourth possible implementation of the first aspect, the delivering the network data based on the multicast group and a group scheduling identifier corresponding to the multicast group by using an air interface resource corresponding to the multicast group includes:

determining worst channel quality information based on channel quality information of terminals indicated by terminal identifiers in the multicast group;

determining a data scheduling policy based on the worst channel quality information; and delivering the network data based on the data scheduling policy and the group scheduling identifier by using the air interface resource.

In a fifth possible implementation of the first aspect, before the receiving a multicast group join request sent by a terminal, the method further includes:

sending the multicast group join request to a gateway, where the gateway is configured to return a multicast group join notification, and the multicast group join notification carries the target channel identifier; and when the multicast group notification is received, obtaining the first channel record information.

In a sixth possible implementation of the first aspect, the method further includes:

receiving a multicast group leave request sent by the terminal, where the multicast group leave request carries the target channel identifier; and deleting the terminal identifier from the multicast group corresponding to the target channel identifier; or sending the multicast group leave request to a gateway, where the gateway is configured to return a multicast group removal notification, and the multicast group removal notification carries the target channel identifier; and when the multicast group removal notification is received, deleting the terminal identifier from the multicast group corresponding to the target channel identifier.

In a seventh possible implementation of the first aspect, the method further includes:

broadcasting group scheduling identifier information, or sending the group scheduling identifier information to any connected terminal by using dedicated signaling, where the terminal is configured to determine, based on the group scheduling identifier information, a group scheduling identifier corresponding to each channel identifier; or sending the group scheduling identifier information to the terminal after the terminal identifier is added to the multicast group corresponding to the target channel identifier, where the terminal is configured to determine, based on the group scheduling identifier information, a group scheduling identifier corresponding to the target channel identifier, where the group scheduling identifier information includes a correspondence between one or more channel identifiers and a group scheduling identifier, or includes a list of group scheduling identifiers arranged in a corresponding channel identifier sequence, or includes the group scheduling identifier corresponding to the target channel identifier.

According to a second aspect, a network data processing method is provided, where the method is applied to a terminal, and includes:

sending a multicast group join request to a base station, where the multicast group join request carries a target channel identifier, the multicast group join request is used to request to add a terminal identifier of the terminal to a multicast group corresponding to the target channel identifier, and the multicast group includes an identifier of a terminal that has requested network data corresponding to the target channel identifier;

determining a group scheduling identifier corresponding to the target channel identifier, where the base station is configured to deliver the network data based on the multicast group and a group scheduling identifier corresponding to the multicast group by using an air interface resource corresponding to the multicast group; and decoding the air interface resource based on the group scheduling identifier, to obtain the network data.

In a first possible implementation of the second aspect, the determining a group scheduling identifier corresponding to the target channel identifier includes:

obtaining group scheduling identifier information sent by the base station, where the base station is configured to: broadcast the group scheduling identifier information, or send the group scheduling identifier information to the terminal by using dedicated signaling, or send the group scheduling identifier information to the terminal after the terminal identifier is added to the multicast group corresponding to the target channel identifier; and when the group scheduling identifier information includes a correspondence between one or more channel identifiers and a group scheduling identifier, determining, based on the correspondence, the group scheduling identifier corresponding to the target channel identifier; or when the group scheduling identifier information includes a list of group scheduling identifiers arranged in a corresponding channel identifier sequence, determining, based on a sequence of the target channel identifier, a group scheduling identifier that is in the group scheduling identifier list and that matches the sequence, to serve as the group scheduling identifier corresponding to the target channel identifier; or when the group scheduling identifier information includes the group scheduling identifier corresponding to the target channel identifier, determining the group scheduling identifier included in the group scheduling identifier information.

According to a third aspect, a network data processing method is provided, where the method is applied to a gateway, and includes:

when network data delivered by a server is received, determining a target channel identifier corresponding to the network data;

determining a communication resource identifier corresponding to the target channel identifier, where a base station identifier corresponding to the target channel identifier is used to determine a base station that has requested the network data corresponding to the target channel identifier, and the communication resource identifier is used to determine a communication resource between the gateway and the base station; and delivering the network data by using the communication resource, where the base station is configured to: determine the communication resource identifier based on the target channel identifier, receive the network data based on the communication resource identifier, and deliver the network data to a terminal that requests the network data.

In a first possible implementation of the third aspect, the determining a communication resource identifier corresponding to the target channel identifier includes:

obtaining second channel record information, where the second channel record information includes at least one record entry, and each record entry includes at least one or more of a channel identifier, a communication resource identifier, and a base station identifier; and determining, based on the second channel record information, the communication resource identifier corresponding to the target channel identifier.

In a second possible implementation of the third aspect, the method further includes:

receiving a network data request sent by the base station, where the network data request carries the target channel identifier, and the network data request is used to request to obtain the network data corresponding to the target channel identifier;

assigning a communication resource identifier to the target channel identifier and the base station identifier, or obtaining, from preset configuration information, a communication resource identifier corresponding to the target channel identifier and the base station identifier;

adding a second target record entry to the second channel record information, where the second target record entry includes one or more of the target channel identifier, the communication resource identifier, and the base station identifier; and sending a network data request to the server, where the network data request carries the target channel identifier, and the network data request is used to request to obtain the network data corresponding to the target channel identifier; and receiving the network data delivered by the server.

In a third possible implementation of the third aspect, the method further includes:

receiving a multicast group join request sent by the base station, where the multicast group join request is sent by the terminal to the base station, the multicast group join request carries the target channel identifier, and the multicast group join is used to request to add a terminal identifier of the terminal to a multicast group corresponding to the target channel identifier; and sending a multicast group join notification to the base station, where the multicast group join notification carries the target channel identifier, where the base station is configured to add the terminal identifier to the multicast group corresponding to the target channel identifier, and the base station is further configured to deliver the network data based on the multicast group and a group scheduling identifier corresponding to the multicast group by using an air interface resource corresponding to the multicast group, where a terminal in the multicast group is configured to decode the air interface resource based on the group scheduling identifier, to obtain the network data.

In a fourth possible implementation of the third aspect, the method further includes:

receiving a multicast group leave request sent by the base station, where the multicast group leave request is sent by the base station to the gateway, and the multicast group leave request carries the target channel identifier; and sending a multicast group removal notification to the base station, where the base station is configured to delete the terminal identifier from the multicast group corresponding to the target channel identifier.

According to a fourth aspect, a network data processing apparatus is provided, where the apparatus is configured to perform the method provided in the first aspect.

According to a fifth aspect, a network data processing apparatus is provided, where the apparatus is configured to perform the method provided in the second aspect.

According to a sixth aspect, a network data processing apparatus is provided, where the apparatus is configured to perform the method provided in the third aspect.

Beneficial effects brought by the technical solutions provided in the embodiments of this disclosure are as follows:

Terminals that obtain network data on a same channel are grouped into a multicast group based on multicast group join requests of the terminals. The base station delivers the network data on the same channel to each terminal in the multicast group based on one air interface resource, and each terminal in the multicast group may obtain the network data based on a group scheduling identifier corresponding to the channel. In addition, for network data on any channel, the base station delivers the network data to the terminal only when the network data is network data requested by the terminal. Therefore, fewer air interface resources are occupied between the base station and the terminal.

Further, the gateway delivers the network data on the same channel to the base station based on one communication resource, and the base station may obtain the network data based on the communication resource. Therefore, fewer communication resources are occupied between the gateway and the base station.

Further, the base station selects the worst channel quality information from the channel quality information corresponding to the terminals in the multicast group, determines the data scheduling policy based on the worst channel quality information, and delivers the network data based on the data scheduling policy. Therefore, it can be ensured that each terminal in the multicast group can receive the network data, so as to increase a data transmission speed.

DESCRIPTION OF EMBODIMENTS

To make the objectives, technical solutions, and advantages of this disclosure clearer, the following further describes the implementations of this disclosure in detail with reference to the accompanying drawings.

Figure 1A:
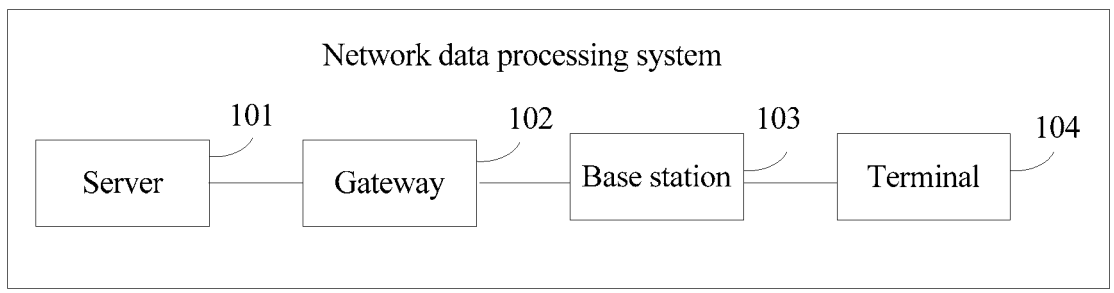
FIG. 1A is a schematic structural diagram of a network data processing system according to an embodiment of this disclosure.

FIG. 1A is a schematic structural diagram of a network data processing system according to an embodiment of this disclosure. The network data processing system includes a server 101, a gateway 102, a base station 103, and a terminal 104. A data connection is established between the server 101 and the gateway 102 by using a data cable or in another manner, data communication is performed between the gateway 102 and the base station 103 by using a communication resource, and data communication is performed between the base station 103 and the terminal 104 by using an air interface resource.

The network data processing system may be applied to long term evolution (LTE), a universal mobile telecommunications system (UMTS), 5G, or another system structure. The network data processing system is configured to provide a network data service for a user, for example, may be applied to a scenario in which the user watches network television or a live video.

The server 101 is configured to: provide various types of network data such as a digital television and a live video, and deliver the network data to the gateway 102. The server 101 may be an interactive personality television (IPTV) server, a third-party (Over The Top, OTT) server, a real-time content processing system, a streaming media service system, or the like.

The gateway 102 is configured to: receive the network data delivered by the server 101, and deliver the network data to the base station 103. The gateway 102 may be an interactive personality television gateway (I-GW), a multi-cell/multicast coordination entity (MCE), or the like.

The base station 103 is configured to: receive the network data delivered by the gateway 102, and deliver the network data to the terminal 104. The base station 103 may be an evolved NodeB (eNB) or a base station of another type.

The terminal 104 is configured to: receive the network data delivered by the base station 103, and display the network data to the user. The terminal 104 may be customer premises equipment (CPE) or user equipment (UE). The CPE may be a network set-top box, a home gateway, or the like. The UE may be a mobile phone, a tablet computer, a computer, a wearable device, or the like.

Figure 1B:
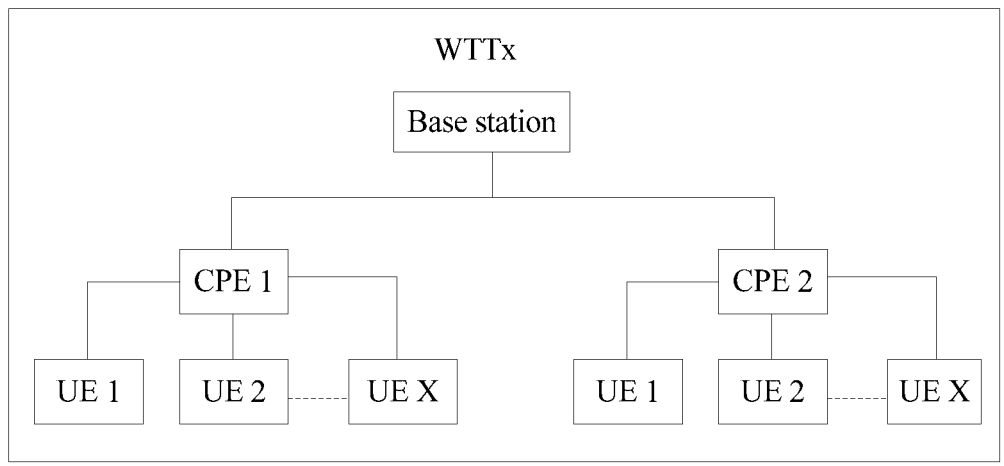
FIG. 1B is a schematic diagram of a scenario of wireless to the x according to an embodiment of this disclosure.

Referring to FIG. 1B, the network data system may be applied to a scenario of wireless to the x (WTTx). The terminal is at least one CPE (two CPEs are merely used as an example in FIG. 1B). The base station and the at least one CPE are connected over wireless broadband, and may perform data communication by using an air interface resource provided by the wireless broadband. Each CPE and at least one UE may be connected over a Wi-Fi (Wireless Fidelity) connection, or may perform data communication in another manner. When receiving the network data delivered by the base station, specific CPE may deliver the network data to the at least one connected UE. The UE displays the network data to the user.

The base station and the CPE may be connected over the wireless broadband, and a cable does not need to be laid between the base station and the CPE, so as to reduce costs. In addition, when any UE needs to access a network, the UE only needs to access the CPE over the Wi-Fi connection, which is simple, and helps the base station to provide the network data for the UE in time.

Alternatively, the terminal may be UE. The UE may be connected to the base station by using a data network, and may directly display the network data delivered by the base station to the user. The data network may be provided by an operator subscribing to the UE, or may be obtained by the UE in another manner.

Figure 1C:
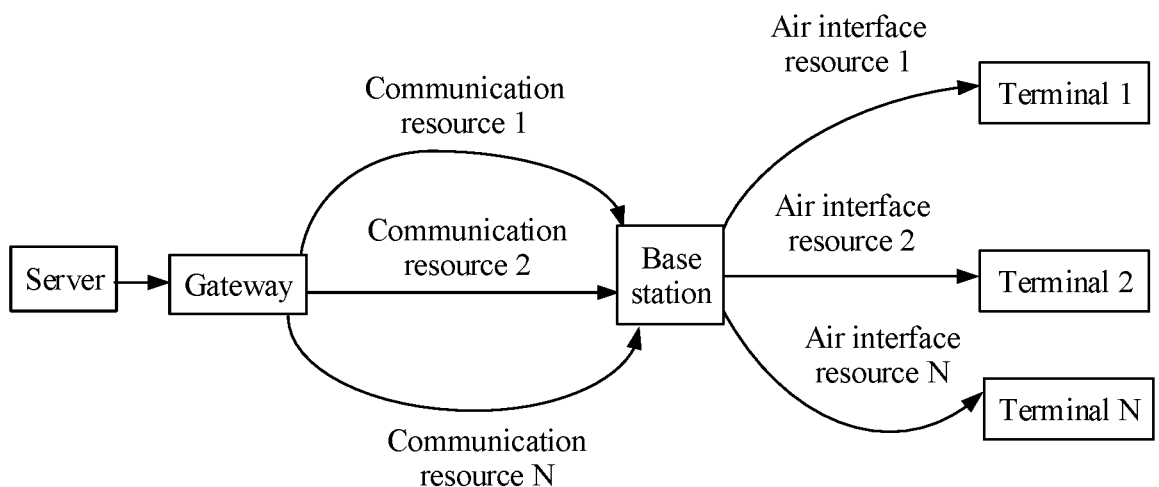
FIG. 1C is a schematic diagram of a network data delivery procedure according to a related technology.

When network data is to be processed in a related technology, as shown in FIG. 1C, for a plurality of terminals that need to obtain network data on a same channel, a gateway establishes a communication resource between the gateway and a base station for each terminal. The base station establishes an air interface resource between the base station and each terminal. The gateway duplicates the network data to obtain a plurality of pieces of network data based on a quantity of terminals, and separately delivers, to the base station by using different communication resources, network data required by different terminals. The base station separately receives, by using different communication resources, network data required by different terminals, and then delivers the network data to the different terminals by using different air interface resources.

Figure 1D:
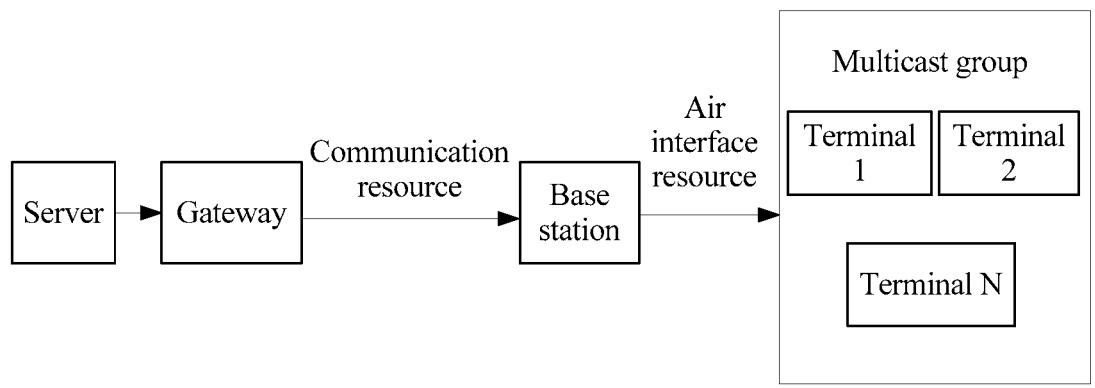
FIG. 1D is a schematic diagram of a network data delivery procedure according to an embodiment of this disclosure.

When network data is to be processed in the network data processing system in this embodiment of this disclosure, as shown in FIG. 1D, terminals that obtain network data on a target channel are grouped into a multicast group based on multicast group join requests of the terminals. The gateway does not need to establish a communication resource for each terminal in the multicast group, and does not need to duplicate the network data. The base station also does not need to establish an air interface resource for each terminal in the multicast group. The gateway delivers network data corresponding to a target channel identifier to the base station based on one communication resource. The base station delivers the network data to each terminal in the multicast group based on one air interface resource, and each terminal in the multicast group may obtain the network data based on a group scheduling identifier. Therefore, fewer communication resources are occupied between the gateway and the base station, and fewer air interface resources are occupied between the base station and the terminal.

Figure 2:
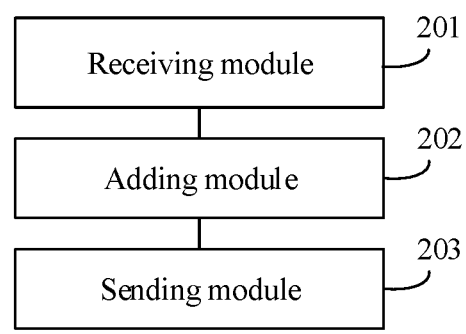
FIG. 2 is a schematic structural diagram of a network data processing apparatus according to an embodiment of this disclosure.

FIG. 2 is a schematic structural diagram of a network data processing apparatus according to an embodiment of this disclosure. The apparatus is applied to a base station, and the apparatus includes a receiving module 201, an adding module 202, and a sending module 203.

The receiving module 201 is configured to receive a multicast group join request sent by a terminal. The multicast group join request carries a target channel identifier, and the multicast group join request is used to request to add a terminal identifier of the terminal to a multicast group corresponding to the target channel identifier.

The adding module 202 is configured to add the terminal identifier to the multicast group corresponding to the target channel identifier. The multicast group includes an identifier of a terminal that has requested network data corresponding to the target channel identifier.

The sending module 203 is configured to deliver the network data based on the multicast group and a group scheduling identifier corresponding to the multicast group by using an air interface resource corresponding to the multicast group. A terminal in the multicast group is configured to decode the air interface resource based on the group scheduling identifier, to obtain the network data.

In the apparatus provided in this embodiment, terminals that obtain network data on a same channel are grouped into a multicast group based on multicast group join requests of the terminals. The base station delivers the network data on the same channel to each terminal in the multicast group based on one air interface resource, and each terminal in the multicast group may obtain the network data based on a group scheduling identifier corresponding to the channel. In addition, for network data on any channel, the base station delivers the network data to the terminal only when the network data is network data requested by the terminal. Therefore, fewer air interface resources are occupied between the base station and the terminal.

Optionally, the adding module 202 includes:

an obtaining submodule, configured to obtain first channel record information, where the first channel record information includes at least one record entry, and each record entry includes at least one or more of a channel identifier, a group scheduling identifier, and a multicast group;

a determining submodule, configured to determine, based on the first channel record information, the multicast group corresponding to the target channel identifier; and an adding submodule, configured to add the terminal identifier to the multicast group.

Optionally, the apparatus further includes:

a determining module, configured to determine a communication resource identifier corresponding to the target channel identifier, where the communication resource identifier is used to determine a communication resource used by a gateway to deliver the network data to the base station; and the receiving module 201 is further configured to receive, based on the communication resource identifier, the network data delivered by the gateway.

Optionally, the apparatus further includes:

a determining module, configured to: when the first channel record information does not include a group scheduling identifier corresponding to the target channel identifier, assign the group scheduling identifier to the target channel identifier, or obtain, from preset configuration information, the group scheduling identifier corresponding to the target channel identifier, or receive the group scheduling identifier that is corresponding to the target channel identifier and that is sent by a gateway;

the adding module 202 is further configured to add a first target record entry to the first channel record information, where the first target record entry includes one or more of the target channel identifier, the group scheduling identifier, and the terminal identifier; and the sending module 203 is further configured to send a network data request to the gateway, where the network data request carries the target channel identifier, and the network data request is used to request to obtain the network data corresponding to the target channel identifier and receive the network data sent by the gateway.

Optionally, the sending module 203 includes:

a determining submodule, configured to determine worst channel quality information based on channel quality information of terminals indicated by terminal identifiers in the multicast group, where the determining submodule is further configured to determine a data scheduling policy based on the worst channel quality information; and a sending submodule, configured to deliver the network data based on the data scheduling policy and the group scheduling identifier by using the air interface resource.

Optionally, the sending module 203 is further configured to send the multicast group join request to a gateway, where the gateway is configured to return a multicast group join notification, and the multicast group join notification carries the target channel identifier; and the adding module 202 is further configured to: when the multicast group notification is received, obtain the first channel record information.

Optionally, the apparatus further includes a deletion module, where the receiving module 201 is further configured to receive a multicast group leave request sent by the terminal, where the multicast group leave request carries the target channel identifier; and the deletion module is configured to delete the terminal identifier from the multicast group corresponding to the target channel identifier; or the sending module 203 is further configured to send the multicast group leave request to a gateway, where the gateway is configured to return a multicast group removal notification, and the multicast group removal notification carries the target channel identifier; and the deletion module is configured to: when the multicast group removal notification is received, delete the terminal identifier from the multicast group corresponding to the target channel identifier.

Optionally, the sending module 203 is further configured to: broadcast group scheduling identifier information, or send the group scheduling identifier information to any connected terminal by using dedicated signaling, where the terminal is configured to determine, based on the group scheduling identifier information, a group scheduling identifier corresponding to each channel identifier; or send the group scheduling identifier information to the terminal after the terminal identifier is added to the multicast group corresponding to the target channel identifier, where the terminal is configured to determine, based on the group scheduling identifier information, a group scheduling identifier corresponding to the target channel identifier, where the group scheduling identifier information includes a correspondence between one or more channel identifiers and a group scheduling identifier, or includes a list of group scheduling identifiers arranged in a corresponding channel identifier sequence, or includes the group scheduling identifier corresponding to the target channel identifier.

Figure 3:
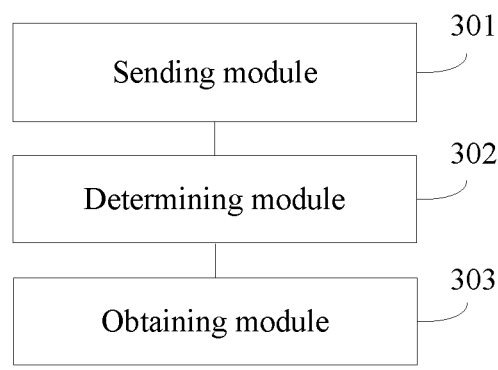
FIG. 3 is a schematic structural diagram of a network data processing apparatus according to an embodiment of this disclosure.

FIG. 3 is a schematic structural diagram of a network data processing apparatus according to an embodiment of this disclosure. The apparatus is applied to a terminal, and the apparatus includes a sending module 301, a determining module 302, and an obtaining module 303.

The sending module 301 is configured to send a multicast group join request to a base station. The multicast group join request carries a target channel identifier, the multicast group join request is used to request to add a terminal identifier of the terminal to a multicast group corresponding to the target channel identifier, and the multicast group includes an identifier of a terminal that has requested network data corresponding to the target channel identifier.

The determining module 302 is configured to determine a group scheduling identifier corresponding to the target channel identifier. The base station is configured to deliver the network data based on the multicast group and a group scheduling identifier corresponding to the multicast group by using an air interface resource corresponding to the multicast group.

The obtaining module 303 is configured to decode the air interface resource based on the group scheduling identifier, to obtain the network data.

In the apparatus provided in this embodiment, the multicast group join request is sent to the base station, the terminal identifier of the terminal is added to the multicast group corresponding to the target channel identifier, the group scheduling identifier corresponding to the target channel identifier is determined, and the air interface resource is decoded based on the group scheduling identifier, to obtain the network data. Therefore, for the base station, the base station may deliver the network data to each terminal in the multicast group based on one air interface resource, and does not need to individually establish an air interface resource for each terminal. For network data on any channel, the base station delivers the network data to the terminal only when the network data is network data requested by the terminal. Therefore, fewer air interface resources are occupied between the base station and the terminal.

Optionally, the determining module 302 includes:

an obtaining submodule, configured to obtain group scheduling identifier information sent by the base station, where the base station is configured to: broadcast the group scheduling identifier information, or send the group scheduling identifier information to the terminal by using dedicated signaling, or send the group scheduling identifier information to the terminal after the terminal identifier is added to the multicast group corresponding to the target channel identifier; and a determining submodule, configured to: when the group scheduling identifier information includes a correspondence between one or more channel identifiers and a group scheduling identifier, determine, based on the correspondence, the group scheduling identifier corresponding to the target channel identifier; or when the group scheduling identifier information includes a list of group scheduling identifiers arranged in a corresponding channel identifier sequence, determine, based on a sequence of the target channel identifier, a group scheduling identifier that is in the group scheduling identifier list and that matches the sequence, to serve as the group scheduling identifier corresponding to the target channel identifier; or when the group scheduling identifier information includes the group scheduling identifier corresponding to the target channel identifier, determine the group scheduling identifier included in the group scheduling identifier information.

Figure 4:
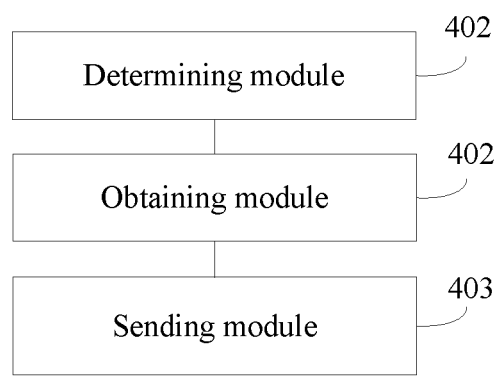
FIG. 4 is a schematic structural diagram of a network data processing apparatus according to an embodiment of this disclosure.

FIG. 4 is a schematic structural diagram of a network data processing apparatus according to an embodiment of this disclosure. The apparatus is applied to a gateway, and the apparatus includes a determining module 401, an obtaining module 402, and a sending module 403.

The determining module 401 is configured to: when network data delivered by a server is received, determine a target channel identifier corresponding to the network data.

The determining module 401 is further configured to determine a communication resource identifier corresponding to the target channel identifier. A base station identifier corresponding to the target channel identifier is used to determine a base station that has requested the network data corresponding to the target channel identifier, and the communication resource identifier is used to determine a communication resource between the gateway and the base station.

The sending module 403 is configured to deliver the network data by using the communication resource. The base station is configured to: determine the communication resource identifier based on the target channel identifier, receive the network data based on the communication resource identifier, and deliver the network data to a terminal that requests the network data.

In the apparatus provided in this embodiment, when the network data delivered by the server is received, the target channel identifier corresponding to the network data is determined, the communication resource identifier corresponding to the target channel identifier is determined, and the network data is delivered by using the communication resource determined by using the communication resource identifier. Therefore, network data on a same channel is delivered to the base station based on one communication resource, and the base station may obtain the network data based on the communication resource. Therefore, fewer communication resources are occupied between the gateway and the base station.

Optionally, the determining module 401 includes:

an obtaining submodule, configured to obtain second channel record information, where the second channel record information includes at least one record entry, and each record entry includes at least one or more of a channel identifier, a communication resource identifier, and a base station identifier; and a determining submodule, configured to determine, based on the second channel record information, the communication resource identifier corresponding to the target channel identifier.

Optionally, the apparatus further includes a receiving module and an adding module, where the receiving module is configured to receive a network data request sent by the base station, where the network data request carries the target channel identifier, and the network data request is used to request to obtain the network data corresponding to the target channel identifier;

the determining module 401 is further configured to: assign a communication resource identifier to the target channel identifier and the base station identifier, or obtain, from preset configuration information, a communication resource identifier corresponding to the target channel identifier and the base station identifier;

the adding module is configured to add a second target record entry to the second channel record information, where the second target record entry includes one or more of the target channel identifier, the communication resource identifier, and the base station identifier;

the sending module 403 is further configured to send a network data request to the server, where the network data request carries the target channel identifier, and the network data request is used to request to obtain the network data corresponding to the target channel identifier; and the receiving module is further configured to receive the network data delivered by the server.

Optionally, the apparatus further includes:

a receiving module, configured to receive a multicast group join request sent by the base station, where the multicast group join request is sent by the terminal to the base station, the multicast group join request carries the target channel identifier, and the multicast group join is used to request to add a terminal identifier of the terminal to a multicast group corresponding to the target channel identifier; and the sending module 403 is further configured to send a multicast group join notification to the base station, where the multicast group join notification carries the target channel identifier, where the base station is configured to add the terminal identifier to the multicast group corresponding to the target channel identifier, and the base station is further configured to deliver the network data based on the multicast group and a group scheduling identifier corresponding to the multicast group by using an air interface resource corresponding to the multicast group, where a terminal in the multicast group is configured to decode the air interface resource based on the group scheduling identifier, to obtain the network data.

Optionally, the apparatus further includes:

a receiving module, configured to receive a multicast group leave request sent by the base station, where the multicast group leave request is sent by the base station to the gateway, and the multicast group leave request carries the target channel identifier; and the sending module 403 is further configured to send a multicast group removal notification to the base station, where the base station is configured to delete the terminal identifier from the multicast group corresponding to the target channel identifier.

All of the foregoing optional technical solutions may form optional embodiments of this disclosure by using any combination. Details are not described herein.

It should be noted that when the network data processing apparatus provided in the foregoing embodiment processes the network data, division of the foregoing function modules is used only as an example for description. In actual application, the foregoing functions may be allocated to different function modules and implemented based on a requirement, in other words, an internal structure of the base station, the terminal, or the gateway is divided into different function modules for implementing all or some of the functions described above.

Figure 5:
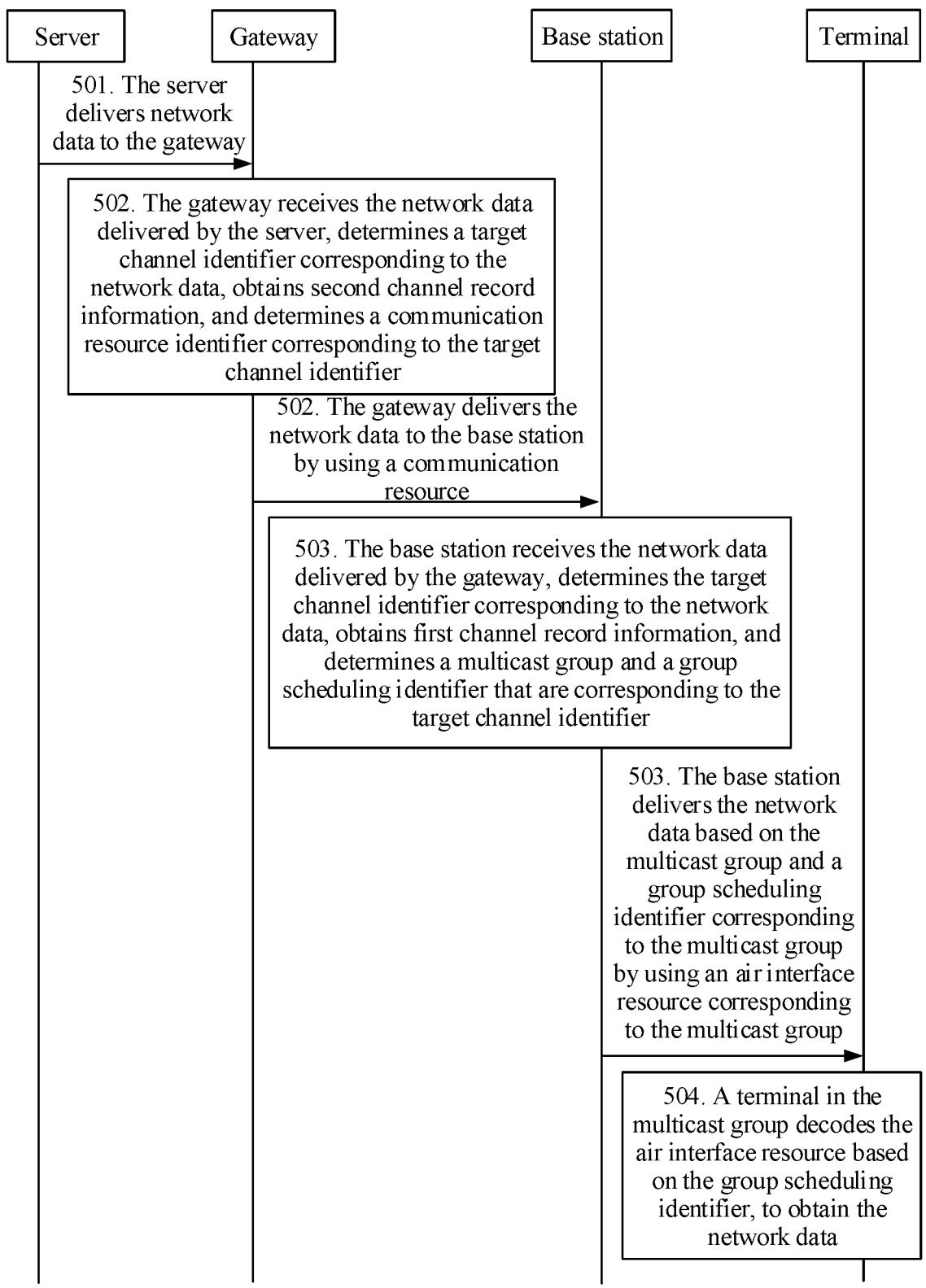
FIG. 5 is a flowchart of a network data processing method according to an embodiment of this disclosure.

FIG. 5 is a flowchart of a network data processing method according to an embodiment of this disclosure. Referring to FIG. 5, an interaction body in the method includes a server, a gateway, a base station, and a terminal, and the method includes the following steps.

501. The server delivers network data to the gateway.

The network data may be recorded network data, and may be recorded and edited by another device and then sent to the server. The server may prestore the network data. Alternatively, the network data may be live streaming data. After photographing, a photographing device may obtain live streaming data, and send the live streaming data to the server. The server may receive the live streaming data.

A channel identifier is used to uniquely determine a corresponding channel, and may be an Internet protocol (IP) address of the channel, a channel name, a number assigned by the server to the channel, a live streaming room name, or the like. Network data may be corresponding to a channel identifier. For example, a recorded program may be corresponding to a channel name, and live streaming data may be corresponding to a live streaming room name. The server may add a corresponding channel identifier to delivered network data, to distinguish between network data on different channels.

502. The gateway receives the network data delivered by the server, determines a target channel identifier corresponding to the network data, obtains second channel record information, determines a communication resource identifier corresponding to the target channel identifier, and delivers the network data to the base station by using a communication resource.

After receiving the network data delivered by the server, the gateway determines the target channel identifier of the network data, and determines, by using the second channel record information, the communication resource identifier corresponding to the target channel identifier. The second channel record information is used to record a channel identifier of network data currently required by each base station. The second channel record information is generated by the gateway based on a received network data request from each base station, and is updated based on a network data delivery stop request from each base station. The second channel record information may be shown in Table 1, and the second channel record information includes at least one record entry. Each record entry includes at least one or more of a channel identifier, a communication resource identifier, and a base station identifier.

TABLE 1

| Second channel record information | | | |
|---|---|---|---|
| Record entry | Channel identifier | Communication resource identifier | Base station identifier |
| Record entry 1 | Multicast IP 1 | RAB 1 | eNB 1 |
| Record entry 2 | | RAB 2 | eNB 2 |
| Record entry 3 | Multicast IP 2 | RAB 3 | eNB 1 |
| Record entry 4 | | RAB 4 | eNB 2 |

The communication resource identifier is used to determine a communication resource between the gateway and the base station. The communication resource is a channel through which data communication is performed between the gateway and the base station, and may be used to deliver the network data. The communication resource may be a user plane bearer such as a radio access bearer (RAB) or an S1 bearer. Correspondingly, the communication resource identifier may be a name, a number, an IP address, or the like of the user plane bearer. In addition, the communication resource may alternatively be a general packet radio service tunneling protocol (GTP) tunnel. Correspondingly, the communication resource identifier may be an IP address, a user datagram protocol (UDP 1) port, a tunnel endpoint identifier (TEID), or the like of the GTP tunnel.

The base station identifier is used to uniquely determine a corresponding base station, and is, for example, a name or a number of the base station.

The channel identifier, the communication resource identifier, and the base station identifier are corresponding to each other. In an example in which the channel identifier is the target channel identifier, a base station identifier corresponding to the target channel identifier is used to determine a base station that has requested the network data corresponding to the target channel identifier. When receiving a network data request that carries the target channel identifier and that is sent by the base station, the gateway may add the corresponding base station identifier to the second channel record information. After receiving a network data delivery stop request sent by the base station, the gateway may delete the base station identifier. Alternatively, after determining that a terminal that requests the network data corresponding to the target channel identifier does not exist in terminals connected to the base station, the gateway may delete the base station identifier. The communication resource identifier corresponding to both the target channel identifier and the base station identifier is used to determine a communication resource used when the network data corresponding to the target channel identifier is delivered to the base station corresponding to the base station identifier.

A correspondence between the target channel identifier and the base station identifier is established, so that for any base station, when the base station is connected to a plurality of terminals that request the network data corresponding to the target channel identifier, the gateway only needs to send one piece of network data to the base station, and does not need to send a plurality of pieces of same network data to the base station for the terminals.

In an example in which the target channel identifier corresponding to the network data is "multicast IP 1", the gateway queries the second channel record information, determines that communication resource identifiers corresponding to the "multicast IP 1" are a "RAB 1" and a "RAB 2", sends one piece of network data to a base station "eNB 1" by using the communication resource "RAB 1", and sends another piece of network data to a base station "eNB 2" by using the communication resource "RAB 2".

In a related technology, when a plurality of base stations request network data corresponding to a same target channel identifier, for each base station, the gateway needs to determine a quantity of terminals that are in terminals connected to the base station and that request the network data, duplicates the network data to obtain a plurality of pieces of network data based on the quantity of terminals, and separately sends the plurality of pieces of same network data to the base station by using a plurality of communication resources. However, in this embodiment, for each base station, the gateway only needs to send one piece of network data to the base station by using a communication resource between the gateway and the base station. Therefore, fewer communication resources are occupied, a required quantity of duplications of the network data is reduced, and fewer transmission resources are occupied between the gateway and the base station.

503. The base station receives the network data delivered by the gateway, determines the target channel identifier corresponding to the network data, obtains first channel record information, determines a multicast group and a group scheduling identifier that are corresponding to the target channel identifier, and delivers the network data based on the multicast group and a group scheduling identifier corresponding to the multicast group by using an air interface resource corresponding to the multicast group.

After receiving the network data delivered by the server, the base station determines the target channel identifier of the network data, and determines, by using the first channel record information, the multicast group and the group scheduling identifier that are corresponding to the target channel identifier.

The first channel record information may be shown in Table 2, and the first channel record information includes at least one record entry. Each record entry includes at least one or more of a channel identifier, a group scheduling identifier, and a multicast group that are corresponding to each other.

TABLE 2

| | First channel record information | | |
|---|---|---|---|
| Record entry | Channel identifier | Group scheduling identifier | Multicast group |
| Record entry 1 | Multicast IP 1 | G-RNTI 1 | CPE 1, CPE 2, and UE 1 |

TABLE 2-continued

| | First channel record information | | |
|---|---|---|---|
| Record entry | Channel identifier | Group scheduling identifier | Multicast group |
| Record entry 2 | Multicast IP 2 | G-RNTI 2 | CPE 2, UE 2, and UE 3 |
| Record entry N | . . . | . . . | . . . |

The group scheduling identifier is used to decode the air interface resource to obtain the network data, and the group scheduling identifier may be a group radio network temporary identifier (G RNTI). The multicast group is configured to aggregate at least one terminal that requests network data on a same channel, to deliver the network data to each terminal in the multicast group by using a unified air interface resource.

The channel identifier, the group scheduling identifier, and the multicast group are corresponding to each other. In an example in which the channel identifier is the target channel identifier, the multicast group corresponding to the target channel identifier includes an identifier of a terminal that has requested the network data corresponding to the target channel identifier. When the network data corresponding to the target channel identifier is delivered by using the air interface resource corresponding to the multicast group, a terminal in the multicast group decodes the air interface resource based on the group scheduling identifier corresponding to the target channel identifier, to obtain the network data. For example, as shown in Table 3, the air interface resource carries network data on a "channel 1", network data on a "channel 2", and network data on a "channel 3", and the air interface resource is decoded by using a group scheduling identifier "G-RNTI 1", to obtain the network data on the "channel 1".

TABLE 3

| Air interface resource | | |
|---|---|---|
| Channel 1 (G-RNTI 1) | Channel 2 (G-RNTI 2) | Channel 3 (G-RNTI 3) |

Optionally, a coverage area of the base station may include a plurality of cells, and for terminals in different cells, the base station may deliver the network data by using different group scheduling identifiers. Therefore, the first channel record information may further include cell identifier information, and the cell identifier information is corresponding to the channel identifier, the group scheduling identifier, and the multicast group. The base station may query the first channel record information, and separately deliver the network data based on a multicast group and a group scheduling identifier that are corresponding to each piece of cell identifier information. Alternatively, the base station may store a plurality of pieces of first channel record information, establish a correspondence between first channel record information and cell identifier information, distinguish between first channel record information of different cells, query first channel record information corresponding to each piece of cell identifier information, and deliver the network data separately based on a multicast group and a group scheduling identifier in each piece of first channel record information.

After determining the multicast group and the group scheduling identifier that are corresponding to the target channel identifier, the base station may deliver the network data based on the multicast group and the group scheduling identifier by using the air interface resource corresponding to the multicast group.

A process of delivering the network data by using the air interface resource may include the following steps 5031 to 5033.

5031. The base station determines worst channel quality information based on channel quality information of terminals indicated by terminal identifiers in the multicast group.

The terminals indicated by the terminal identifiers in the multicast group send the channel quality information to the base station, and the base station may receive and store the channel quality information of the terminals. Channel quality information is used to indicate channel quality when data communication is performed between a corresponding terminal and the base station. When channel quality of the terminal changes, channel quality information sent by the terminal also changes.

In actual application, the channel quality information may be a channel quality indicator (CQI), and a smaller CQI indicates worse channel quality between the corresponding terminal and the base station. In this case, the base station may select a smallest CQI from CQIs of the terminal identifiers in the multicast group, the smallest CQI indicates the worst channel quality information, and a terminal identifier corresponding to the smallest CQI is a terminal identifier with worst channel quality in the multicast group.

5032. The base station determines a data scheduling policy based on the worst channel quality information.

After determining the worst channel quality information in the channel quality information of the terminals indicated by the terminal identifiers in the multicast group, the base station may determine the data scheduling policy.

Specifically, the base station may divide the network data into at least one data block based on the channel quality information, and determine the data scheduling policy. The data scheduling policy includes at least one of a time-frequency resource block location at which each data block is carried, a size of each data block, and a modulation and coding scheme (MCS) of each data block.

In actual application, the base station may obtain a correspondence between the channel quality information and the data scheduling policy, and determine a to-be-used data scheduling policy based on the worst channel quality information and the correspondence. For example, the correspondence is shown in Table 4. After determining that the worst channel quality information is a "CQI x", the base station may determine that the network data is divided into two data blocks. One data block is carried at a time-frequency resource block location m, a size of the data block is a, an MCS of the data block is b. The other data block is carried at a time-frequency resource block location n, a size of the data block is c, and an MCS of the data block is d.

TABLE 4

| | Data scheduling policy | | |
|---|---|---|---|
| Channel quality information | Time-frequency resource block location | Size of a data block | MCS |
| CQI x | m | a | b |
| | n | c | d |

5033. The base station delivers the network data based on the data scheduling policy and the group scheduling identifier by using the air interface resource corresponding to the multicast group.

In actual application, a terminal with worse channel quality information has a worse capability of receiving the network data. The base station selects the worst channel quality information in the channel quality information corresponding to the terminals in the multicast group, determines the data scheduling policy based on the worst channel quality information, and delivers the network data. Therefore, it can be ensured that a terminal with worst channel quality in the multicast group can successfully receive the network data, so that it can be ensured that each terminal in the multicast group can successfully receive the network data, and any terminal in the multicast group can successfully receive the network data.

After the base station determines the corresponding group scheduling identifier based on the channel identifier, and determines the data scheduling policy based on the channel quality information of the terminals in the multicast group, the base station may deliver the network data based on the data scheduling policy and the group scheduling identifier by using the air interface resource corresponding to the multicast group.

Specifically, the air interface resource may include a plurality of resource blocks, and each resource block may be a slot, a subcarrier, an antenna port, or the like. The air interface resource may carry a large amount of data based on the resource block. For example, the air interface resource may include a physical data channel, a physical control channel, and a physical broadcast channel. The physical data channel may be a physical downlink shared channel (PDSCH), and the physical control channel may be a physical downlink control channel (PDCCH).

The base station may obtain a determined size of each data block based on the data scheduling policy, divide the network data into at least one data block, perform modulation and coding on each data block based on a determined MCS of each data block, and add each data block to a determined corresponding time-frequency resource block based on a determined time-frequency resource block location at which each data block is carried, so that the physical data channel carries the network data.

In addition, the base station may generate downlink control information (DCI) for the network data. The DCI is used to indicate information such as a resource block location, an MCS, initial transmission or retransmission-related information, a layer, and precoding of each piece of network data on the physical data channel. The base station may add the DCI to the physical control channel through a cyclic redundancy check (CRC) or in another manner.

In addition, the base station may establish a correspondence between the DCI and the group scheduling identifier. After adding the DCI to the physical control channel, the base station adds a group scheduling identifier corresponding to the DCI to the physical control channel through scrambling or in another manner. Because the DCI is corresponding to the group scheduling identifier, the terminal can obtain the DCI only when the terminal decodes the physical control channel based on the group scheduling identifier corresponding to the DCI, and cannot obtain the DCI when the terminal decodes the physical control channel by using another group scheduling identifier. Because a terminal that is not in the multicast group does not learn of the group scheduling identifier, the terminal cannot obtain the DCI through decoding and cannot obtain the network data. Therefore, it can be ensured that only the terminal in the multicast group can obtain the network data.

504. A terminal in the multicast group decodes the air interface resource based on the group scheduling identifier, to obtain the network data.

In actual application, when the terminal needs to obtain the network data corresponding to the target channel identifier, the terminal decodes the physical data channel, to obtain the network data from the PDSCH. Specifically, the terminal detects the physical control channel in real time or periodically, and decodes, in real time or periodically, the physical control channel based on the group scheduling identifier corresponding to the target channel identifier. After the base station delivers the network data by using the air interface resource, the terminal may decode the physical control channel to obtain DCI attached to the physical control channel, and determine, based on the DCI, required information such as a resource block location of the network data and a modulation order of the network data, in other words, may obtain, from the physical data channel, the network data delivered by the base station.

The terminal may receive group scheduling identifier information sent by the base station, store the group scheduling identifier information, and subsequently obtain the group scheduling identifier information, to determine, based on the group scheduling identifier information, the group scheduling identifier corresponding to the target channel identifier.

In a first possible implementation, the group scheduling identifier information includes a correspondence between a channel identifier and a group scheduling identifier. The terminal may determine, based on the correspondence, the group scheduling identifier corresponding to the target channel identifier. For example, the correspondence may be shown in Table 5. When the target channel identifier is "multicast IP 1", the terminal may determine that the group scheduling identifier is a "G-RNTI 1". It should be noted that because the channel identifier may include a channel name and a channel IP address, the correspondence between the channel identifier and the group scheduling identifier may also include a correspondence between the channel name and the group scheduling identifier and a correspondence between the channel IP address and the group scheduling identifier.

TABLE 5

| Channel identifier | Group scheduling identifier |
| --- | --- |
| Multicast IP 1 | G-RNTI 1 |
| Multicast IP 2 | G-RNTI 2 |
| ... | ... |

In a second possible implementation, the group scheduling identifier information includes a list of group scheduling identifiers arranged in a corresponding channel identifier sequence. The terminal may determine, based on a sequence of the target channel identifier, a group scheduling identifier that is in the group scheduling identifier list and that matches the sequence, to serve as the group scheduling identifier corresponding to the target channel identifier. For example, the target channel identifier that needs to be obtained by the terminal is a second channel identifier in channel identifiers, and the group scheduling identifier information includes "G-RNTI 1, G-RNTI 2, . . . , and G-RNTI N". The terminal may determine that the group scheduling identifier corresponding to the target channel identifier is a "G-RNTI 2".

In a third possible implementation, the group scheduling identifier information includes the group scheduling identifier corresponding to the target channel identifier, in other words, the group scheduling identifier information may include only the group scheduling identifier corresponding to the target channel identifier, namely, a group scheduling identifier that has been requested by the terminal, and does not include another group scheduling identifier. The terminal may directly determine that the group scheduling identifier included in the group scheduling identifier information is the group scheduling identifier corresponding to the target channel identifier.

It should be noted that, when the terminal needs to simultaneously obtain network data corresponding to a plurality of target channel identifiers, the terminal determines a group scheduling identifier corresponding to each target channel identifier, and obtains corresponding network data based on each group scheduling identifier. For example, when the terminal is CPE, and the CPE is connected to at least one UE, each UE may select one channel identifier, and the CPE needs to provide network data corresponding to the selected channel identifier. Therefore, the CPE needs to determine a target channel identifier of the network data that needs to be provided for each UE, and obtains the corresponding network data based on each target channel identifier. Certainly, in addition to the group scheduling identifier corresponding to each target channel identifier, the terminal may further determine another scheduling identifier, and obtain, based on the another scheduling identifier, data other than the network data.

In the method provided in this embodiment, terminals that obtain network data on a same channel are grouped into a multicast group based on multicast group join requests of the terminals. The base station delivers the network data on the same channel to each terminal in the multicast group based on one air interface resource, and each terminal in the multicast group may obtain the network data based on a group scheduling identifier corresponding to the channel. In addition, for network data on any channel, the base station delivers the network data to the terminal only when the network data is network data requested by the terminal. Therefore, fewer air interface resources are occupied between the base station and the terminal.

Further, the gateway delivers the network data on the same channel to the base station based on one communication resource, and the base station may obtain the network data based on the communication resource. Therefore, fewer communication resources are occupied between the gateway and the base station.

Further, the base station selects the worst channel quality information in the channel quality information corresponding to the terminal in the multicast group, determines the data scheduling policy based on the worst channel quality information, and delivers the network data based on the data scheduling policy. Therefore, it can be ensured that each terminal in the multicast group can receive the network data, so as to increase a data transmission speed.

Based on the foregoing embodiment, considering that the terminal frequently selects a channel, switches a channel, and leaves a channel in daily life, and therefore a channel identifier used by the terminal to request to deliver the network data changes, a multicast group corresponding to the channel identifier also changes. Therefore, each multicast group needs to be dynamically updated based on a current channel identifier corresponding to the terminal. For an updating process, refer to the following embodiments shown in FIG. 6A and FIG. 6B to FIG. 8.

Figure 6A:
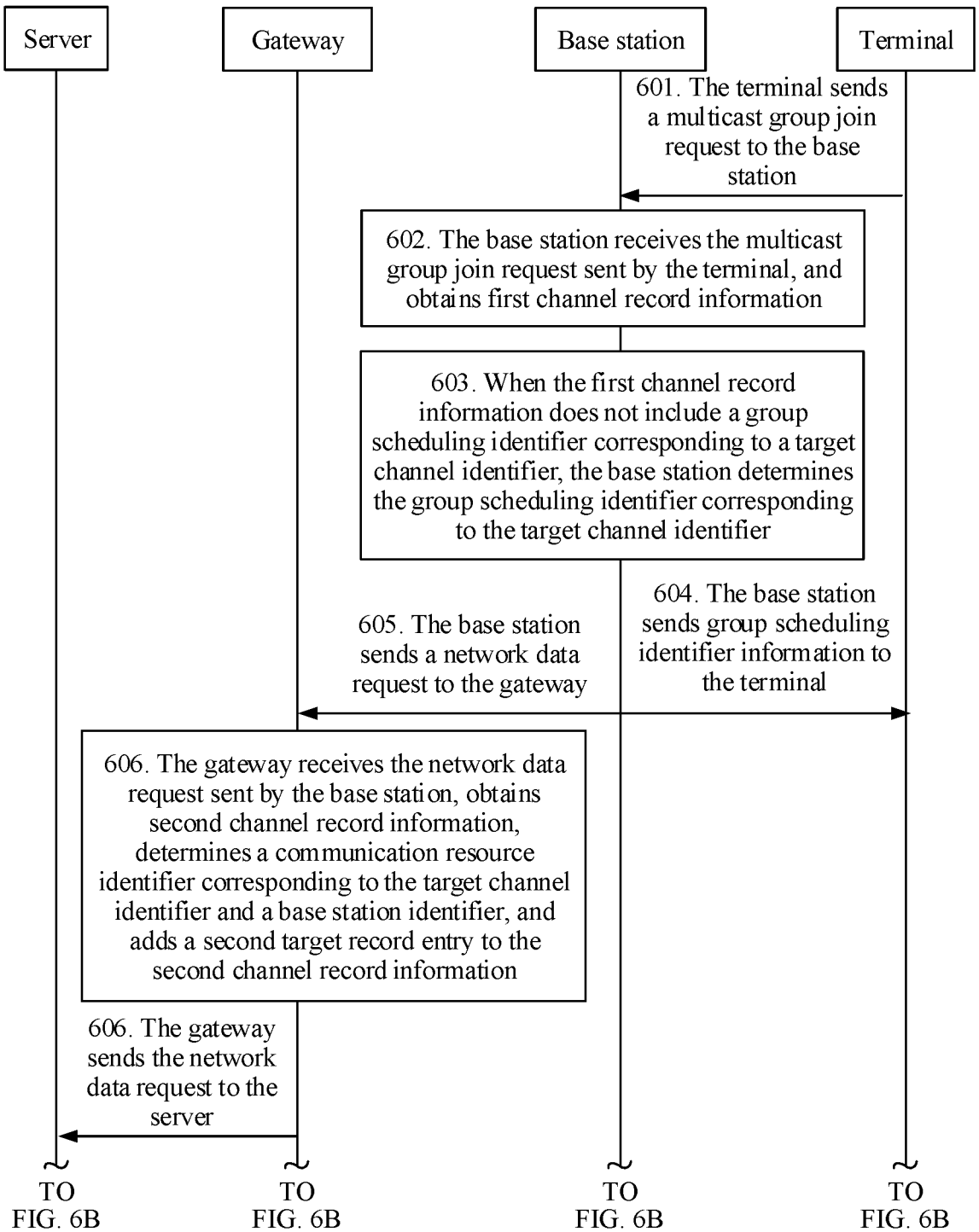
FIG. 6A and FIG. 6B are a flowchart of a network data processing method according to an embodiment of this disclosure.
Figure 6B:
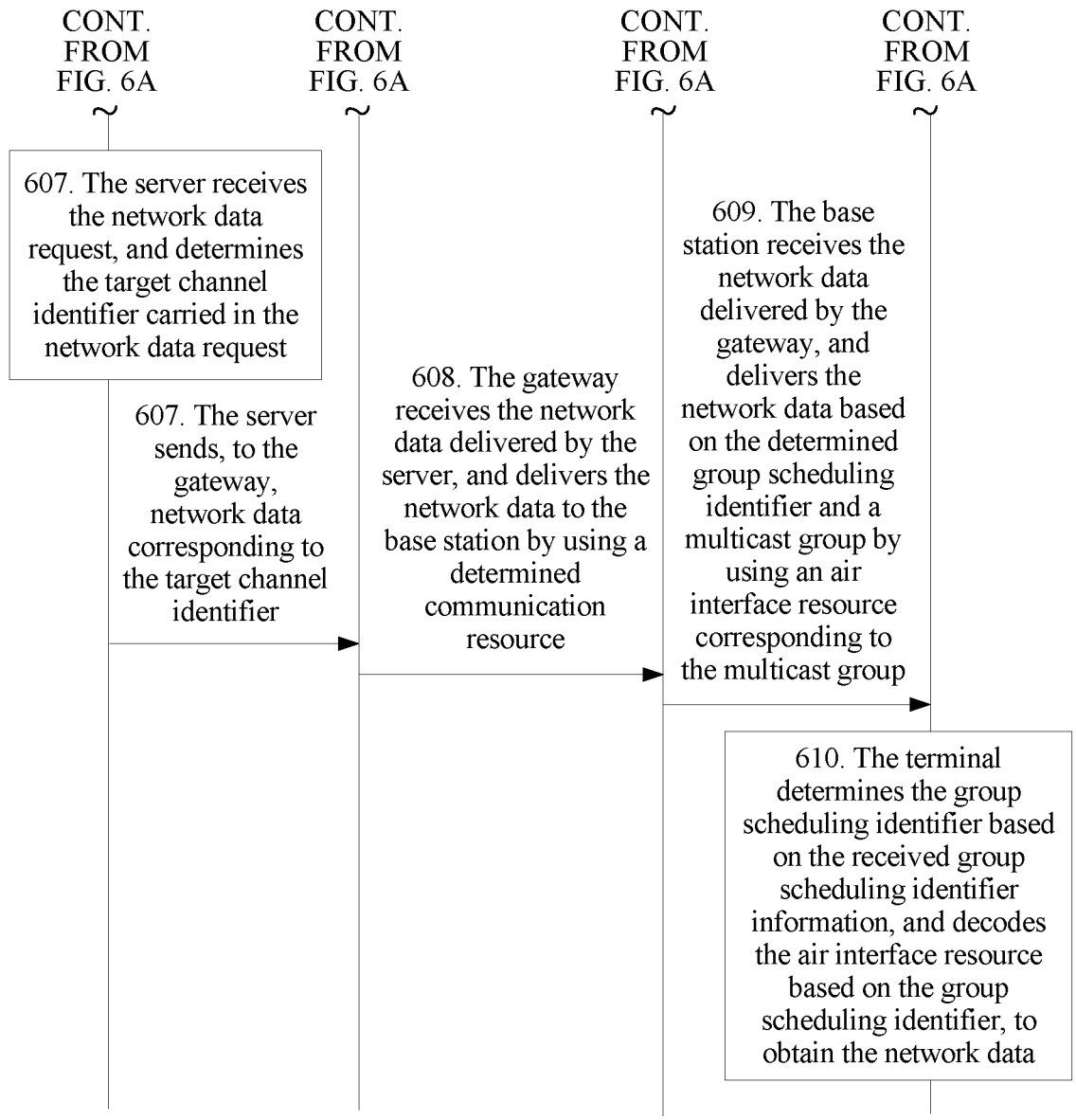

When the terminal needs to obtain network data on a target channel, the terminal needs to be added to the multicast group corresponding to the target channel identifier. Therefore, this disclosure provides a network data processing method. As shown in FIG. 6A and FIG. 6B, the method includes the following step.

601. The terminal sends a multicast group join request to a base station.

The terminal may display a channel list interface, and a user may perform a selection operation in the channel list interface. The terminal may determine, based on the selection operation performed by the user, a target channel identifier corresponding to the selection operation. Alternatively, after being powered on, the terminal may obtain a channel identifier of network data viewed by the user before the terminal is powered off, and use the channel identifier as the target channel identifier. Certainly, the terminal may further determine the target channel identifier in another manner, for example, use a default channel identifier as the target channel identifier. This is not limited in this disclosure.

In addition, before displaying the channel list interface, the terminal may send an authorization verification request to a server. The authorization verification request carries a terminal identifier. After receiving the authorization verification request, the server may send an authorization success notification to the terminal when determining that the terminal identifier is corresponding to an authorized terminal. The authorization success notification may carry a channel identifier, a channel sequence, a uniform resource locator (URL), and the like of each channel. When receiving the authorization success notification, the terminal displays the channel list interface.

After determining the target channel identifier, the terminal sends the multicast group join request to the base station. The multicast group join request carries the target channel identifier, and the multicast group join request is used to request to add the terminal to a multicast group corresponding to the target channel identifier. Considering that the terminal may send a plurality of multicast group join requests for a plurality of channel identifiers, the target channel identifier is added to the multicast group join requests, so that multicast group join requests for different multicast groups can be distinguished between each other.

602. The base station receives the multicast group join request sent by the terminal, and obtains first channel record information.

After receiving the multicast group join request sent by the terminal, the base station may determine a terminal identifier of the terminal.

In a possible implementation, the base station allocates one uplink sending resource to each terminal, and the uplink sending resource is used to distinguish between different terminals that send multicast group join requests. In the foregoing step 601, the terminal may send the multicast group join request to the base station based on an allocated uplink sending resource. After receiving the multicast group join request based on the uplink sending resource, the base station may determine the terminal identifier of the terminal by using the uplink sending resource. The uplink sending resource may include a slot, a subcarrier, and the like.

In another possible implementation, in the foregoing step 601, the terminal may add the terminal identifier of the terminal to the multicast group join request, and send the multicast group join request. After receiving the multicast group join request, the base station may obtain the terminal identifier carried in the multicast group join request.

In actual application, the terminal may send a plurality of requests to the base station, for example, a multicast group join request and a multicast group leave request. Therefore, to distinguish between different requests, the base station may detect a format, content, and routing address information of each request, to determine a type of the request. In addition, the terminal may further send a plurality of multicast group join requests to the base station, and different multicast group join requests are added to different multicast groups.

In a possible implementation, the terminal may send the multicast group join request based on a first preset format, or add first preset content to the multicast group join request. The base station may detect at least one of a format and content of any request. When the format of the request is the first preset format, or the content of the request includes the first preset content, the base station determines that the request is the multicast group join request.

In another possible implementation, the terminal may set the target channel identifier as a routing address of the multicast group join request. When the base station receives any request, if the base station determines that a routing address of the request is the target channel identifier, the base station determines that the request is the multicast group join request, and determines that the multicast group join request is added to the multicast group corresponding to the target channel identifier.

After receiving the multicast group join request sent by the terminal, the base station obtains the target channel identifier in the multicast group join request, and obtains the first channel record information. The first channel record information records a terminal identifier in each multicast group. The base station may add, by using the first channel record information, the terminal identifier to the multicast group corresponding to the target channel identifier.

Optionally, after receiving the multicast group join request, the base station may send the multicast group join request to a gateway. When receiving a multicast group join notification returned by the gateway, in other words, when confirming that the gateway agrees to add the terminal identifier to the multicast group, the base station obtains the first channel record information. The multicast group notification carries the target channel identifier.

The base station may separately send multicast group join requests to the gateway by using communication resources corresponding to terminals. When receiving the multicast group join requests, the gateway may determine, in the terminals corresponding to the communication resources, a terminal corresponding to any multicast group join request. Alternatively, the base station may determine, by using uplink sending resources used when multicast group join requests are sent, terminals corresponding to the multicast group join requests, correspondingly add terminal identifiers of the terminals to the multicast group join requests, and send the multicast group join requests to the gateway by using a unified communication resource allocated to the target channel identifier. When receiving the multicast group join requests, the gateway may determine, by using the terminal identifiers carried in the multicast group join requests, a terminal identifier corresponding to any multicast group join request.

603. When the first channel record information does not include a group scheduling identifier corresponding to a target channel identifier, the base station determines the group scheduling identifier corresponding to the target channel identifier.

When the first channel record information does not include the target channel identifier, the base station obtains the group scheduling identifier corresponding to the target channel identifier, and adds a first target record entry to the first channel record information. The first target record entry includes the target channel identifier, the group scheduling identifier, and the terminal identifier.

Alternatively, when the first target record entry includes the target channel identifier, but both the group scheduling identifier and the multicast group that are corresponding to the target channel identifier are empty, the base station obtains the group scheduling identifier corresponding to the target channel identifier, and correspondingly adds the determined group scheduling identifier and the terminal identifier to the first target record entry corresponding to the target channel identifier.

Determining the group scheduling identifier corresponding to the target channel identifier may be assigning the group scheduling identifier to the target channel identifier, or obtaining, from preset configuration information, the group scheduling identifier corresponding to the target channel identifier, or receiving the group scheduling identifier that is corresponding to the target channel identifier and that is sent by the gateway.

In a possible implementation, the base station may assign the group scheduling identifier to the target channel identifier. The base station may obtain scheduling identifier (Group-Radio Network Temporary Identifier, RNTI) assigning space, and the RNTI assigning space stores a plurality of to-be-assigned group scheduling identifiers. In addition to the group scheduling identifier, the RNTI assigning space may further include a scheduling identifier of another type, for example, a cell radio network temporary identifier (C-RNTI), a system information radio network temporary identifier (SI-RNTI), or a paging radio network temporary identifier (P-RNTI), in other words, the group scheduling identifier and the scheduling identifier of another type may share the RNTI assigning space. The base station may select a current idle group scheduling identifier from the RNTI assigning space, and use the group scheduling identifier as the group scheduling identifier corresponding to the target channel identifier.

In a second possible implementation, a correspondence between a channel identifier and a group scheduling identifier may be predetermined, and is stored in the preset configuration information. In this case, the base station may obtain the preset configuration information, and obtain, based on the preset configuration information, the group scheduling identifier corresponding to the target channel identifier.

In a third possible implementation, the gateway may replace the base station to determine the group scheduling identifier corresponding to the target channel identifier, and send the group scheduling identifier to the base station. The base station may receive the group scheduling identifier, and establish a correspondence between the group scheduling identifier and the target channel identifier.

After determining the group scheduling identifier corresponding to the target channel identifier and the terminal identifier, the base station may add the first target record entry to the first channel record information. The first target record entry includes one or more of the target channel identifier, the group scheduling identifier, and the terminal identifier, and the first target record entry is used to record a correspondence among the target channel identifier, the group scheduling identifier, and the terminal identifier.

Optionally, when there is only one terminal in a specific multicast group, the base station may assign no group scheduling identifier, and delivers network data by using a specified scheduling identifier assigned to the terminal. In other words, the base station only needs to send the network data to the terminal based on channel quality information of the terminal, and does not need to consider another terminal.

Specifically, when the base station needs to deliver data to a specific terminal, the base station assigns a specified scheduling identifier to the terminal in advance, and delivers the data to the terminal by using the specified scheduling identifier. The specified scheduling identifier is used to distinguish between different terminals. When the specified scheduling identifier is used to deliver any data, it indicates that the data is delivered to the terminal indicated by the specified scheduling identifier, and is not delivered to any terminal other than the terminal. The specified scheduling identifier may be a C-RNTI.

Therefore, for any multicast group, when the multicast group includes only one terminal identifier, the base station may not need to assign a group scheduling identifier to a target channel identifier in the multicast group, but directly delivers the network data by using a specified scheduling identifier assigned to a terminal indicated by the terminal identifier. The terminal may decode an air interface resource based on the specified scheduling identifier, to obtain the network data. In addition to the channel quality information, the terminal further needs to send hybrid automatic repeat request (HARQ) feedback to the base station. The base station may learn, by using the HARQ feedback, whether the terminal successfully obtains the network data.

In addition, when other terminals are added to the multicast group, and the multicast group includes a plurality of terminal identifiers, specified scheduling identifiers of the terminals are different. Therefore, the base station needs to assign a unified group scheduling identifier to the multicast group, and the terminals indicated by the terminal identifiers in the multicast group obtain the network data based on a same group scheduling identifier. In addition, the terminals do not need to send HARQ feedbacks to the base station, but only need to send channel quality information to the base station.

It should be noted that considering that the first channel record information may also prestore a group scheduling identifier corresponding to each channel identifier, the base station does not need to obtain the group scheduling identifier corresponding to the target channel identifier, and also does not need to repeatedly add the group scheduling identifier to the first channel record information. In this case, step 603 may be further replaced by the following step 613:

613. When the first channel record information includes the target channel identifier and a group scheduling identifier corresponding to the target channel identifier, and a multicast group corresponding to the target channel identifier is empty, the base station correspondingly adds a terminal identifier to a first target record entry corresponding to the target channel identifier.

604. The base station sends group scheduling identifier information to the terminal.

The base station may send dedicated signaling to the terminal, and add the group scheduling identifier information to the dedicated signaling. The dedicated signaling may be radio resource control (RRC) signaling, or certainly, may be another signaling.

In a possible implementation, the base station may query the first channel record information to determine the group scheduling identifier corresponding to the target channel identifier, and send the group scheduling identifier information to the terminal based only on the group scheduling identifier. In this case, the group scheduling identifier information may include only the group scheduling identifier corresponding to the target channel identifier, or may include only a correspondence between the target channel identifier and the group scheduling identifier.

In another possible implementation, the base station does not need to determine the group scheduling identifier corresponding to the target channel identifier, and may send group scheduling identifiers corresponding to all channel identifiers to the terminal. In this case, the group scheduling identifier information includes a group scheduling identifier corresponding to each channel identifier or a correspondence between each channel identifier and a group scheduling identifier, so as to ensure that the terminal can learn of a group scheduling identifier corresponding to any channel identifier. Therefore, each time the terminal needs to obtain network data corresponding to a specific channel identifier, the terminal may receive the network data based on a determined group scheduling identifier, and does not need to obtain the group scheduling identifier information again. Therefore, when the terminal switches a channel, and needs to obtain network data corresponding to a channel identifier other than the target channel identifier, the base station does not need to send the group scheduling identifier information again.

It should be noted that considering that a channel identifier of each channel may change, when the base station detects that the channel identifier changes, the base station re-determines a correspondence between an updated channel identifier and a group scheduling identifier, generates updated group scheduling identifier information, and sends the group scheduling identifier information to the terminal.

605. The base station sends a network data request to a gateway.

The network data request carries the target channel identifier, and the network data request is used to request to obtain the network data corresponding to the target channel identifier.

606. The gateway receives the network data request sent by the base station, obtains second channel record information, determines a communication resource identifier corresponding to the target channel identifier and a base station identifier, adds a second target record entry to the second channel record information, and sends the network data request to a server.

After receiving the network data request, the gateway obtains the second channel record information. The second channel record information may be shown in Table 1 in the embodiment in FIG. 5. Determining the communication resource identifier corresponding to the target channel identifier and the base station identifier may include: assigning the communication resource identifier to the target channel identifier and the base station identifier. For example, the gateway may select one communication resource from current idle communication resources, and use a communication resource identifier of the communication resource as the communication resource identifier assigned to the target channel identifier and the base station identifier.

Alternatively, determining the communication resource identifier corresponding to the target channel identifier and the base station identifier may include: obtaining, from preset configuration information, the communication resource identifier corresponding to the target channel identifier and the base station identifier. For example, the gateway may obtain the preset configuration information, and the preset configuration information includes a correspondence among a channel identifier, a base station identifier, and a communication resource identifier. The gateway may obtain, from the preset configuration information, the communication resource identifier corresponding to the target channel identifier and the base station identifier.

It should be noted that in actual application, the gateway may be connected to a plurality of base stations, or may be connected to only one base station. When the gateway is connected to only one specified base station, the second channel record information is exclusively used to record each channel identifier and a corresponding communication resource identifier that are requested by the specified base station, and does not relate to a base station other than the specified base station. As shown in Table 6, the second channel record information may include no base station identifier, and includes only a channel identifier and a communication resource identifier that are corresponding to each other. Correspondingly, after the gateway receives a network data request sent by the specified base station, the added second target record entry includes no base station identifier, and includes only the target channel identifier and the corresponding communication resource identifier.

TABLE 6

Second channel record information (eNB 1)

| Record entry | Channel identifier | Communication resource identifier |
| --- | --- | --- |
| Record entry 1 | Multicast IP 1 | RAB 1 |
| Record entry 2 | Multicast IP 2 | RAB 2 |
| Record entry 3 | Multicast IP 3 | RAB 3 |
| Record entry 4 | Multicast IP 4 | RAB 4 |

Further, for the specified base station, the gateway may further deliver network data on channels to the specified base station by using a specified communication resource, and channel identifiers are corresponding to a same communication resource identifier, namely, a communication resource identifier of the specified communication resource. The second channel record information does not relate to any communication resource other than the specified communication resource. Therefore, as shown in Table 7, the second channel record information does not need to record the communication resource identifier, and only needs to record the channel identifier.

TABLE 7

Second channel record information (eNB 1 and RAB 1)

| Record entry | Channel identifier |
| --- | --- |
| Record entry 1 | Multicast IP 1 |
| Record entry 2 | Multicast IP 2 |

607. The server receives the network data request, determines the target channel identifier carried in the network data request, and sends, to the gateway, network data corresponding to the target channel identifier.

608. The gateway receives the network data delivered by the server, and delivers the network data to the base station by using a determined communication resource.

This step is similar to step 502. Details are not described herein again.

609. The base station receives the network data delivered by the gateway, and delivers the network data based on the determined group scheduling identifier and a multicast group by using an air interface resource corresponding to the multicast group.

It should be noted that in the foregoing step 604, when the gateway delivers the network data on the channels to the specified base station by using the specified communication resource, because network data on different channels has different destination IP addresses, the specified base station may distinguish between network data on the channels by using the destination IP addresses. To be specific, when receiving any network data, the specified base station may determine a destination IP address of the network data, determine, based on the destination IP address, a channel identifier corresponding to the network data, select a group scheduling identifier corresponding to the channel identifier, and deliver the network data.

This step is similar to step 503. Details are not described herein again.

610. The terminal determines the group scheduling identifier based on the received group scheduling identifier information, and decodes the air interface resource based on the group scheduling identifier, to obtain the network data.

This step is similar to step 504. Details are not described herein again.

In the method provided in this embodiment, after the multicast group join request sent by the terminal is received, the terminal identifier of the terminal is added to the multicast group corresponding to the target channel identifier. Therefore, the multicast group can be dynamically updated, and any terminal that requests the network data corresponding to the target channel identifier is not omitted.

Based on the foregoing embodiment, when the multicast group corresponding to the target channel identifier already includes another terminal identifier, and the base station receives the multicast group request that is sent by the terminal and to which the target channel identifier is added, because the base station has obtained the network data delivered by the gateway, the base station does not need to resend the network data request to the gateway to repeatedly obtain the network data, in other words, does not need to perform the foregoing steps 605 and 606. Alternatively, the base station may send the multicast group join request to the gateway, to update the first channel record information and add the terminal to the multicast group. Because the base station has delivered the network data on the air interface resource, the base station does not need to repeatedly deliver the network data, in other words, does not need to perform the foregoing step 609, but only needs to add the terminal identifier of the terminal to the multicast group.

It should be noted that, after the terminal identifier is added to the multicast group, when it is determined that the terminal identifier is a terminal identifier corresponding to a terminal with worst channel quality in the current multicast group, the base station needs to update the data scheduling policy based on channel quality information of the terminal corresponding to the terminal identifier when receiving the network data delivered by the gateway, and continues to deliver the network data based on an updated data scheduling policy and the group scheduling identifier. When the terminal identifier is not a terminal identifier corresponding to a terminal with worst channel quality in the current multicast group, the base station does not need to determine the data scheduling policy based on the channel quality of the terminal identifier when receiving the network data delivered by the gateway.

Figure 7:
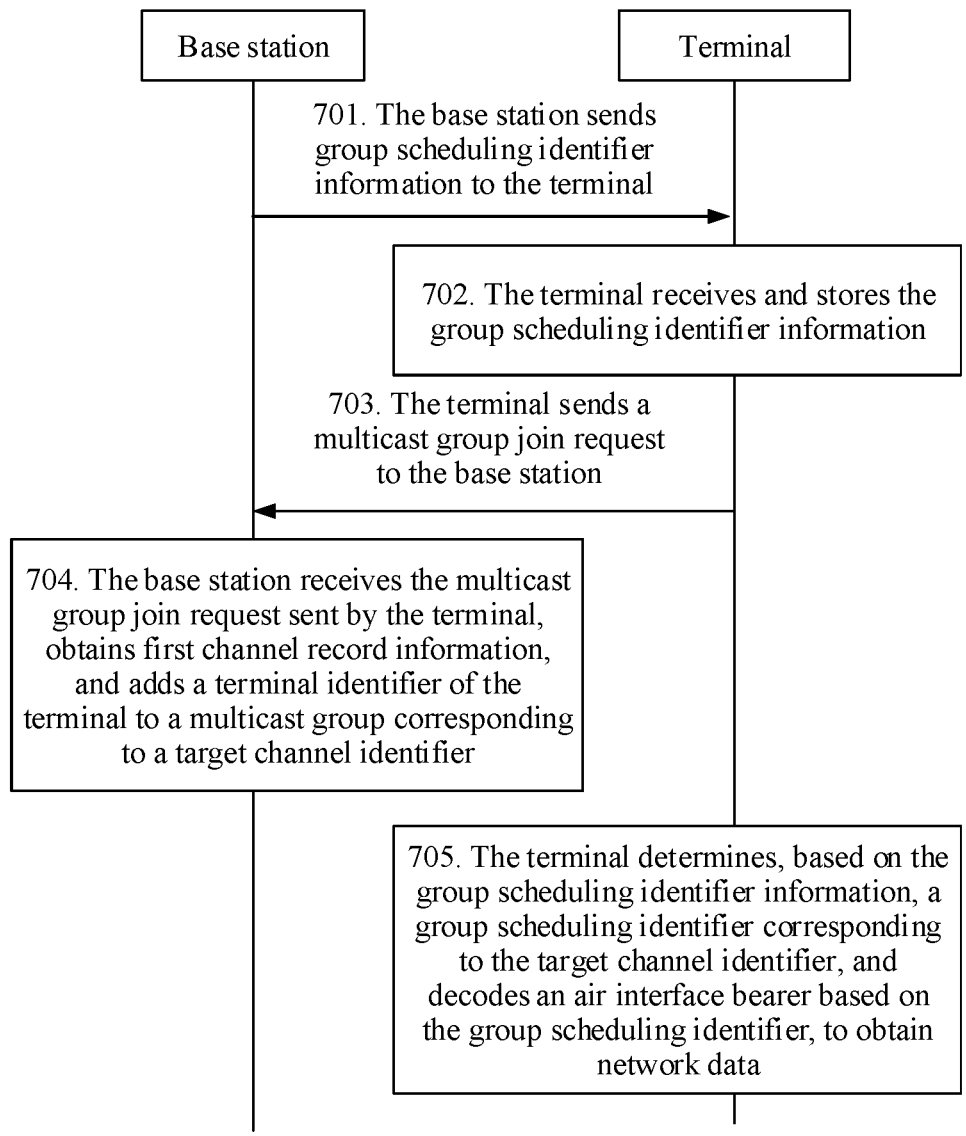
FIG. 7 is a flowchart of a network data processing method according to an embodiment of this disclosure.

Different from the foregoing embodiment, the base station may further assign a group scheduling identifier to each channel identifier in advance, and send the group scheduling identifier information to the terminal before the terminal sends the multicast group join request. Specifically, as shown in FIG. 7, the method includes the following steps.

701. The base station sends group scheduling identifier information to the terminal.

702. The terminal receives and stores the group scheduling identifier information.

In a possible implementation, the base station may broadcast the group scheduling identifier information. For example, the base station may add the group scheduling identifier information to system information. When broadcasting the system information, the base station broadcasts the group scheduling identifier information. For any terminal, when the terminal is in a cell covered by the base station, the terminal may receive the system information, and obtain the group scheduling identifier information carried in the system information. In other words, any terminal that accesses the cell may obtain the group scheduling identifier information. Alternatively, only when the terminal needs to obtain network data, the terminal may actively obtain the group scheduling identifier information carried in the system information. When the terminal does not need to obtain the network data, although the terminal receives the system information, the terminal does not obtain the group scheduling identifier information.

In another possible implementation, after any connected terminal is powered on, and sends an authorization verification request to the base station, the base station may send the group scheduling identifier information to the terminal. For example, the base station may send dedicated signaling to the connected terminal, and add the group scheduling identifier information to the dedicated signaling. Alternatively, when the terminal enters a cell covered by the base station, and needs to be connected to the base station, the terminal may send a connection request to the base station, and add network data service information to the connection request. After receiving the connection request and obtaining the network data service information, the base station establishes a connection to the terminal, and sends the group scheduling identifier information to the terminal over the connection to the terminal.

The group scheduling identifier information includes a correspondence between a channel identifier and a group scheduling identifier, or a plurality of group scheduling identifiers arranged in a corresponding channel identifier sequence.

The base station sends the group scheduling identifier information in advance, in other words, notifies the terminal of the group scheduling identifier corresponding to each channel identifier. Therefore, after sending the multicast group join request subsequently, the terminal may directly obtain, based on the group scheduling identifier information, a group scheduling identifier corresponding to a target channel identifier, to obtain the network data, and does not need to wait for the group scheduling identifier information delivered by the base station. Therefore, an operation procedure is simplified, and a network data processing speed is increased. In addition, when the terminal switches a channel, the base station does not need to deliver a group scheduling identifier corresponding to a switched channel identifier again, so that the terminal quickly obtains network data on any channel based on the group scheduling identifier information.

703. The terminal sends a multicast group join request to a base station.

704. The base station receives the multicast group join request sent by the terminal, obtains first channel record information, and adds a terminal identifier of the terminal to a multicast group corresponding to a target channel identifier.

705. The terminal determines, based on the group scheduling identifier information, a group scheduling identifier corresponding to the target channel identifier, and decodes an air interface resource based on the group scheduling identifier, to obtain network data.

Figure 8:
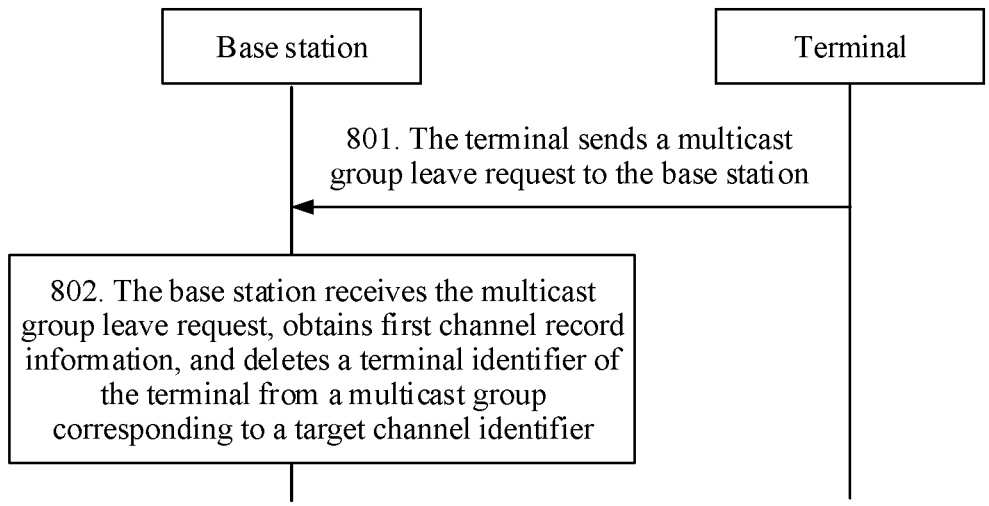
FIG. 8 is a flowchart of a network data processing method according to an embodiment of this disclosure.

When the terminal leaves a target channel, in other words, no longer obtains the network data corresponding to the target channel identifier, the terminal identifier of the terminal needs to be deleted from the multicast group corresponding to the target channel identifier. Specifically, as shown in FIG. 8, the method includes the following steps.

801. The terminal sends a multicast group leave request to a base station.

When detecting an operation such as switching a channel or leaving a channel, the terminal may determine that the network data corresponding to the target channel identifier does not need to be displayed to a user. In this case, the terminal may send the multicast group leave request to the base station, and the multicast group leave request carries the target channel identifier.

When the terminal is connected to at least one UE, and provides network data for the at least one UE, the terminal may store the received network data in a cache. For network data corresponding to any target channel identifier, when UE that requests the network data does not exist in the at least one UE, the terminal may delete the network data from the cache.

802. The base station receives the multicast group leave request, obtains first channel record information, and deletes a terminal identifier of the terminal from a multicast group corresponding to a target channel identifier.

After receiving the multicast group leave request sent by the terminal, the base station may determine the terminal identifier of the terminal.

Specifically, the base station allocates one uplink sending resource to each terminal, and the uplink sending resource is used to distinguish between different terminals that send multicast group leave requests. In the foregoing step 801, the terminal may send the multicast group leave request to the base station based on an allocated uplink sending resource. After receiving the multicast group leave request based on the uplink sending resource, the base station may determine the terminal identifier of the terminal by using the uplink sending resource.

In addition, in the foregoing step 801, the terminal may add the terminal identifier of the terminal to the multicast group leave request, and send the multicast group leave request. After receiving the multicast group leave request, the base station may obtain the terminal identifier carried in the multicast group leave request.

In a possible implementation, the terminal may send the multicast group leave request based on a second preset format, or add second preset content to the multicast group leave request. The base station may detect at least one of a format and content of any request. When the format of the request is the second preset format, or the content of the request includes the second preset content, the base station determines that the request is the multicast group leave request. In addition, the second preset content may include the target channel identifier, and the multicast group leave request carries the target channel identifier by carrying the second preset content.

In another possible implementation, the terminal may set a preset routing address as a routing address of the multicast group leave request. When the base station receives any request, if the base station determines that a routing address of the request is the preset routing address, the base station determines that the request is the multicast group leave request. The preset routing address may be 224.0.0.2.

Optionally, after receiving the multicast group leave request, the base station may send the multicast group leave request to a gateway. When receiving a multicast group removal notification returned by the gateway, the base station obtains the first channel record information. The multicast group removal notification carries the target channel identifier and the terminal identifier.

The base station may separately send multicast group leave requests to the gateway by using communication resources corresponding to terminals. When receiving the multicast group leave requests, the gateway may determine, in the terminals corresponding to the communication resources, a terminal corresponding to any multicast group leave request. Alternatively, the base station may determine terminal identifiers corresponding to multicast group leave requests, correspondingly add the terminal identifiers to the multicast group leave requests, and send the multicast group leave requests to the gateway by using a unified communication resource allocated to the target channel identifier. When receiving the multicast group leave requests, the gateway may determine, by using the terminal identifiers carried in the multicast group leave requests, a terminal corresponding to any multicast group leave request.

It should be noted that, after the terminal identifier is deleted from the multicast group corresponding to the target channel identifier, a quantity of terminal identifiers in the multicast group changes, in other words, the multicast group is updated. Therefore, after receiving the network data that is corresponding to the target channel identifier and that is delivered by the gateway, the base station needs to re-determine worst channel quality information based on channel quality information of terminal identifiers in an updated multicast group. If the worst channel quality information changes, the base station needs to re-determine a data scheduling policy based on current worst channel quality information, to deliver the network data.

The base station always determines a data scheduling policy based on worst channel quality information in a current multicast group, in other words, the base station continuously updates the data scheduling policy as the quantity of terminal identifiers in the multicast group increases or decreases. Therefore, it can be ensured that each terminal in the multicast group can successfully obtain the network data, so as to improve reliability.

It should be further noted that, because the terminal identifier is deleted from the multicast group, the quantity of terminal identifiers in the multicast group decreases. When the multicast group includes at least one terminal identifier, in other words, the multicast group is not empty, the base station still performs the step of receiving the network data delivered by the gateway in the foregoing embodiment. When the multicast group includes no terminal identifier, in other words, the multicast group is empty, the base station does not need to obtain the network data corresponding to the multicast group. In this case, the base station may send a network data delivery stop request to the gateway, and the network data delivery stop request carries a base station identifier of the base station and a channel identifier corresponding to the multicast group. When receiving the network data delivery stop request, the gateway deletes record entries corresponding to the channel identifier and the base station identifier from second channel record information. Alternatively, each time the gateway receives the multicast group leave request, the gateway may determine a channel identifier of the multicast group leave request, and determine whether a terminal that requests the network data corresponding to the channel identifier exists in terminals connected to the base station. When a terminal that requests the network data does not exist in the terminals, the gateway deletes record entries corresponding to the channel identifier and the base station identifier from second channel record information.

Figure 9:
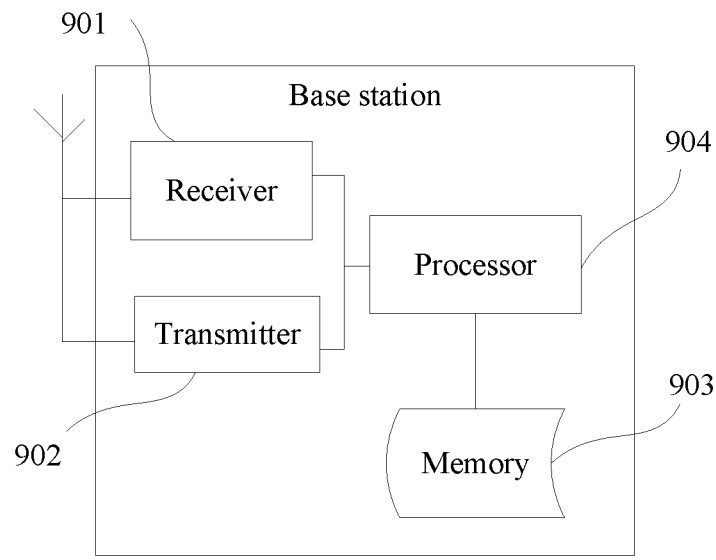
FIG. 9 is a schematic structural diagram of a base station according to an embodiment of this disclosure.

FIG. 9 is a schematic structural diagram of a base station according to an embodiment of this disclosure. Referring to FIG. 9, the base station includes a receiver 901, a transmitter 902, a memory 903, and a processor 904. Each of the receiver 901, the transmitter 902, and the memory 903 is connected to the processor 904. The memory 903 stores program code. The processor 904 is configured to invoke the program code, to perform the operations performed by the base station in the foregoing method embodiments.

Figure 10:
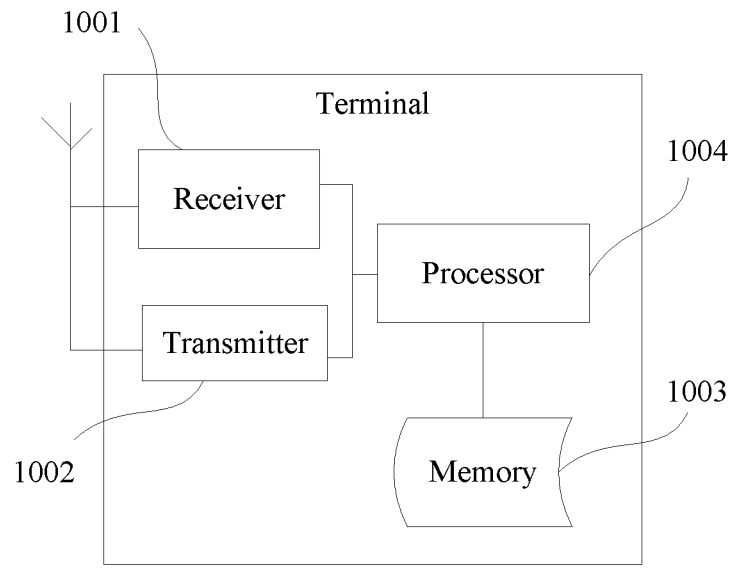
FIG. 10 is a schematic structural diagram of a terminal according to an embodiment of this disclosure.

FIG. 10 is a schematic structural diagram of a terminal according to an embodiment of this disclosure. Referring to FIG. 10, the terminal includes a receiver 1001, a transmitter 1002, a memory 1003, and a processor 1004. Each of the receiver 1001, the transmitter 1002, and the memory 1003 is connected to the processor 1004. The memory 1003 stores program code. The processor 1004 is configured to invoke the program code, to perform the operations performed by the terminal in the foregoing method embodiments.

Figure 11:
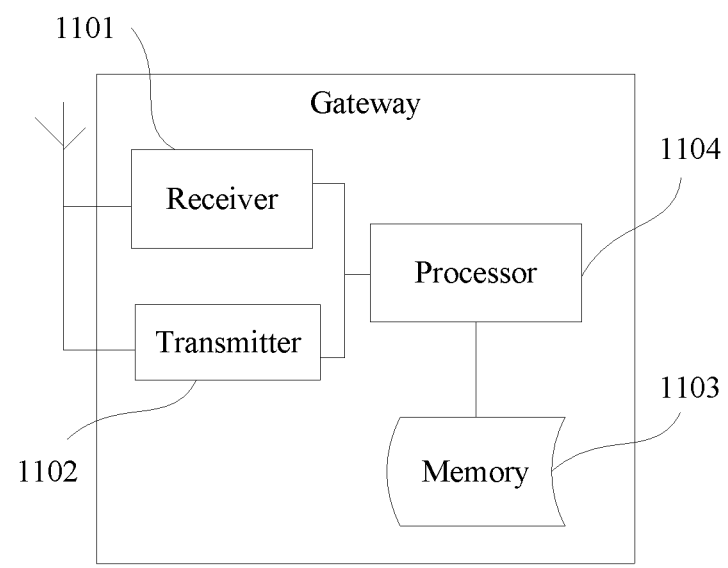
FIG. 11 is a schematic structural diagram of a gateway according to an embodiment of this disclosure.

FIG. 11 is a schematic structural diagram of a gateway according to an embodiment of this disclosure. Referring to FIG. 11, the gateway includes a receiver 1101, a transmitter 1102, a memory 1103, and a processor 1104. Each of the receiver 1101, the transmitter 1102, and the memory 1103 is connected to the processor 1104. The memory 1103 stores program code. The processor 1104 is configured to invoke the program code, to perform the operations performed by the gateway in the foregoing method embodiments.

A person of ordinary skill in the art may understand that all or some of the steps of the embodiments may be implemented by hardware or a program instructing related hardware. The program may be stored in a computer-readable storage medium. The storage medium mentioned above may be a read-only memory, a magnetic disk, an optical disc, or the like.

The foregoing descriptions are merely example embodiments of this disclosure, but are not intended to limit this disclosure. Any modification, equivalent replacement, or improvement made without departing from the spirit and principle of this disclosure should fall within the protection scope of this disclosure.

What is claimed is:

1. A network data processing method, applied to a base station, wherein the method comprises:
   receiving, by the base station, a multicast group join request sent by a first terminal, wherein the multicast group join request carries a target channel identifier, and wherein the multicast group join request is used to request to add a terminal identifier of the first terminal to a multicast group corresponding to the target channel identifier;
   in response to receiving the multicast group join request sent by the first terminal, adding, by the base station, the terminal identifier of the first terminal to the multicast group corresponding to the target channel identifier, wherein the multicast group is corresponding to a group scheduling identifier and the target channel identifier, wherein the group scheduling identifier is used by the first terminal to decode an air interface resource corresponding to the target channel identifier to obtain network data, and wherein the multicast group comprises an identifier of a second terminal that has requested the network data corresponding to the target channel identifier; and
   delivering, by the base station, the network data based on the multicast group and the group scheduling identifier corresponding to the multicast group by using the air interface resource corresponding to the multicast group, wherein each terminal in the multicast group is configured to decode the air interface resource based on the group scheduling identifier to obtain the network data.

2. The method according to claim 1, wherein the adding the terminal identifier to the multicast group corresponding to the target channel identifier comprises:
   obtaining first channel record information, wherein the first channel record information comprises at least one record entry, and wherein each record entry comprises at least one of a channel identifier, a group scheduling identifier, or a multicast group;
   determining, based on the first channel record information, the multicast group corresponding to the target channel identifier; and
   adding the terminal identifier to the multicast group corresponding to the target channel identifier.

3. The method according to claim 2, wherein after the obtaining first channel record information, the method further comprises:
   when the first channel record information does not comprise a group scheduling identifier corresponding to the target channel identifier, assigning the group scheduling identifier to the target channel identifier, or obtaining, from preset configuration information, the group scheduling identifier corresponding to the target channel identifier, or receiving the group scheduling identifier corresponding to the target channel identifier sent by a gateway;
   adding a first target record entry to the first channel record information, wherein the first target record entry comprises one or more of the target channel identifier, the group scheduling identifier, and the terminal identifier; and
   sending a network data request to the gateway, wherein the network data request carries the target channel identifier, and wherein the network data request is used to request to obtain the network data corresponding to the target channel identifier and receive the network data sent by the gateway.

4. The method according to claim 2, wherein before the receiving a multicast group join request sent by a first terminal, the method further comprises:
   sending the multicast group join request to a gateway, wherein the gateway is configured to return a multicast group join notification, and wherein the multicast group join notification carries the target channel identifier; and
   when the multicast group join notification is received, obtaining the first channel record information.

5. The method according to claim 1, wherein before the delivering the network data based on the multicast group and a group scheduling identifier corresponding to the multicast group by using an air interface resource corresponding to the multicast group, the method further comprises:

determining a communication resource identifier corresponding to the target channel identifier, wherein the communication resource identifier is used to determine a communication resource used by a gateway to deliver the network data to the base station; and receiving, based on the communication resource identifier, the network data delivered by the gateway.

6. The method according to claim 1, wherein the delivering the network data based on the multicast group and a group scheduling identifier corresponding to the multicast group by using an air interface resource corresponding to the multicast group comprises:

determining worst channel quality information based on channel quality information of terminals indicated by terminal identifiers in the multicast group;

determining a data scheduling policy based on the worst channel quality information; and delivering the network data based on the data scheduling policy and the group scheduling identifier by using the air interface resource.

7. The method according to claim 1, wherein the method further comprises:

receiving a multicast group leave request sent by the first terminal, wherein the multicast group leave request carries the target channel identifier; and deleting the terminal identifier from the multicast group corresponding to the target channel identifier; or sending the multicast group leave request to a gateway, wherein the gateway is configured to return a multicast group removal notification, and wherein the multicast group removal notification carries the target channel identifier; and when the multicast group removal notification is received, deleting the terminal identifier from the multicast group corresponding to the target channel identifier.

8. The method according to claim 1, wherein the method further comprises:

broadcasting group scheduling identifier information, or sending group scheduling identifier information to any connected terminal by using dedicated signaling, wherein the first terminal is configured to determine, based on the group scheduling identifier information, a group scheduling identifier corresponding to each channel identifier; or sending group scheduling identifier information to the first terminal after the terminal identifier is added to the multicast group corresponding to the target channel identifier, wherein the first terminal is configured to determine, based on the group scheduling identifier information, a group scheduling identifier corresponding to the target channel identifier, wherein the group scheduling identifier information comprises a correspondence between one or more channel identifiers and a group scheduling identifier, or comprises a list of group scheduling identifiers arranged in a corresponding channel identifier sequence, or comprises the group scheduling identifier corresponding to the target channel identifier.

9. A network data processing apparatus, applied to a base station, comprising at least one processor and a non-transitory computer-readable storage medium coupled to the at least one processor and storing programming instructions for execution by the at least one processor, the programming instructions instruct the at least one processor to:

receive, by the base station, a multicast group join request sent by a first terminal, wherein the multicast group join request carries a target channel identifier, and wherein the multicast group join request is used to request to add a terminal identifier of the first terminal to a multicast group corresponding to the target channel identifier;

in response to receiving the multicast group join request sent by the first terminal, add, by the base station, the terminal identifier of the first terminal to the multicast group corresponding to the target channel identifier, wherein the multicast group is corresponding to a group scheduling identifier and the target channel identifier, wherein the group scheduling identifier is used by the first terminal to decode an air interface resource corresponding to the target channel identifier to obtain network data, and wherein the multicast group comprises an identifier of a second terminal that has requested the network data corresponding to the target channel identifier; and deliver, by the base station, the network data based on the multicast group and the group scheduling identifier corresponding to the multicast group by using the air interface resource corresponding to the multicast group, wherein each terminal in the multicast group is configured to decode the air interface resource based on the group scheduling identifier to obtain the network data.

10. The apparatus according to claim 9, wherein the programming instructions instruct the at least one processor to:

obtain first channel record information, wherein the first channel record information comprises at least one record entry, and wherein each record entry comprises at least one of a channel identifier, a group scheduling identifier, and a multicast group;

determine, based on the first channel record information, the multicast group corresponding to the target channel identifier; and add the terminal identifier to the multicast group corresponding to the target channel identifier.

11. The apparatus according to claim 10, wherein the programming instructions instruct the at least one processor to:

when the first channel record information does not comprise a group scheduling identifier corresponding to the target channel identifier, assign the group scheduling identifier to the target channel identifier, or obtain, from preset configuration information, the group scheduling identifier corresponding to the target channel identifier, or receive the group scheduling identifier corresponding to the target channel identifier sent by a gateway;

add a first target record entry to the first channel record information, wherein the first target record entry comprises one or more of the target channel identifier, the group scheduling identifier, and the terminal identifier; and send a network data request to the gateway, wherein the network data request carries the target channel identifier, and wherein the network data request is used to request to obtain the network data corresponding to the target channel identifier and receive the network data sent by the gateway.

12. The apparatus according to claim 10, wherein the programming instructions instruct the at least one processor to:

send the multicast group join request to a gateway, wherein the gateway is configured to return a multicast group join notification, and wherein the multicast group join notification carries the target channel identifier; and when the multicast group join notification is received, obtain the first channel record information.

13. The apparatus according to claim 9, wherein the programming instructions instruct the at least one processor to:
   determine a communication resource identifier corresponding to the target channel identifier, wherein the communication resource identifier is used to determine a communication resource used by a gateway to deliver the network data to the base station; and
   receive, based on the communication resource identifier, the network data delivered by the gateway.

14. The apparatus according to claim 9, wherein the programming instructions instruct the at least one processor to:
   determine worst channel quality information based on channel quality information of terminals indicated by terminal identifiers in the multicast group, wherein determine a data scheduling policy based on the worst channel quality information; and
   deliver the network data based on the data scheduling policy and the group scheduling identifier by using the air interface resource.

15. The apparatus according to claim 9, wherein the programming instructions instruct the at least one processor to:
   receive a multicast group leave request sent by the first terminal, wherein the multicast group leave request carries the target channel identifier; and
   delete the terminal identifier from the multicast group corresponding to the target channel identifier; or
   send the multicast group leave request to a gateway, wherein the gateway is configured to return a multicast group removal notification, and wherein the multicast group removal notification carries the target channel identifier; and when the multicast group removal notification is received, delete the terminal identifier from the multicast group corresponding to the target channel identifier.

16. The apparatus according to claim 9, wherein the programming instructions instruct the at least one processor to:
   broadcast group scheduling identifier information, or send group scheduling identifier information to any connected terminal by using dedicated signaling, wherein the first terminal is configured to determine, based on the group scheduling identifier information, a group scheduling identifier corresponding to each channel identifier; or
   send the group scheduling identifier information to the first terminal after the terminal identifier is added to the multicast group corresponding to the target channel identifier, wherein the first terminal is configured to determine, based on the group scheduling identifier information, a group scheduling identifier corresponding to the target channel identifier, wherein
   the group scheduling identifier information comprises a correspondence between one or more channel identifiers and a group scheduling identifier, or comprises a list of group scheduling identifiers arranged in a corresponding channel identifier sequence, or comprises the group scheduling identifier corresponding to the target channel identifier.

17. A non-transitory computer-readable storage medium comprising instructions which, when executed by at least one processor, cause the at least one processor to perform operations including:
   receiving, by a base station, a multicast group join request sent by a first terminal, wherein the multicast group join request carries a target channel identifier, and wherein the multicast group join request is used to request to add a terminal identifier of the first terminal to a multicast group corresponding to the target channel identifier;
   in response to receiving the multicast group join request sent by the first terminal, adding, by the base station, the terminal identifier of the first terminal to the multicast group corresponding to the target channel identifier, wherein the multicast group is corresponding to a group scheduling identifier and the target channel identifier, wherein the group scheduling identifier is used by the first terminal to decode an air interface resource corresponding to the target channel identifier to obtain network data, and wherein the multicast group comprises an identifier of a terminal that has requested the network data corresponding to the target channel identifier; and
   delivering, by the base station, the network data based on the multicast group and the group scheduling identifier corresponding to the multicast group by using the air interface resource corresponding to the multicast group, wherein each terminal in the multicast group is configured to decode the air interface resource based on the group scheduling identifier to obtain the network data.

* * * * *